United States Patent
Suzuki et al.

(10) Patent No.: US 7,290,481 B2
(45) Date of Patent: Nov. 6, 2007

(54) OSCILLATING TYPE COMPRESSOR

(75) Inventors: Tatsuya Suzuki, Kanagawa (JP); Shinji Masubuchi, Kanagawa (JP); Toru Okuda, Yokohama (JP); Kazunari Komatsu, Yokohama (JP); Shingo Miyake, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/360,816

(22) Filed: Feb. 24, 2006

(65) Prior Publication Data

US 2006/0193735 A1 Aug. 31, 2006

(30) Foreign Application Priority Data

Feb. 28, 2005 (JP) ............................. 2005-053901
Jan. 13, 2006 (JP) ............................. 2006-006101

(51) Int. Cl.
*F16J 15/32* (2006.01)
*F04B 39/00* (2006.01)

(52) U.S. Cl. ........................... 92/240; 92/245; 277/437

(58) Field of Classification Search ................ 92/240, 92/245; 277/437, 439
See application file for complete search history.

(56) References Cited

U.S. PATENT DOCUMENTS

| | | | | | |
|---|---|---|---|---|---|
| 2,246,685 | A | * | 6/1941 | Johansen ...................... | 92/240 |
| 2,836,474 | A | * | 5/1958 | Mosher ........................ | 92/240 |
| 4,730,550 | A | * | 3/1988 | Bramstedt et al. ............ | 92/240 |
| 4,924,759 | A | * | 5/1990 | Plummer ..................... | 92/240 |
| 5,022,312 | A | * | 6/1991 | Rozek et al. ................. | 92/240 |
| 5,064,359 | A | * | 11/1991 | Plummer ..................... | 92/240 |
| 5,231,917 | A | * | 8/1993 | Wood .......................... | 92/240 |

* cited by examiner

*Primary Examiner*—Thomas E. Lazo
(74) *Attorney, Agent, or Firm*—Wenderoth, Lind & Ponack, L.L.P.

(57) ABSTRACT

A lip ring is attached to a piston so as to be rotatable relative to the piston in a circumferential direction, and a seal portion is provided between a ring attachment groove of the piston and an attachment portion of the lip ring. During a suction stroke, the lip ring can be rotated in a circumferential direction of the piston, thus distributing wear around the entire periphery of a lip portion of the lip ring. During a compression stroke, leakage of air from a compression chamber can be prevented by means of the seal portion provided between the ring attachment groove and the lip ring.

16 Claims, 19 Drawing Sheets

OSCILLATING TYPE COMPRESSOR

BACKGROUND OF THE INVENTION

The present invention relates to an oscillating type compressor which can be advantageously used for compressing a fluid such as air.

Generally, an oscillating type compressor comprises: a crank case; a crankshaft rotatably supported by the crank case; a cylinder provided in the crank case; a cylinder head mounted on a distal end portion of the cylinder; an oscillating type piston connected to the crankshaft and capable of reciprocally moving within the cylinder while being oscillated, the piston defining a compression chamber in the cylinder; and a lip ring for providing a seal between the piston and the cylinder.

The lip ring is made of, for example, a resin material having self-lubricating properties. It comprises an annular attachment portion located in a radially inner position and attached to an outer circumferential portion of the piston, and a lip portion which is bent from a radially outer portion of the attachment portion and extends towards the compression chamber, and adapted to make slidable contact with an inner circumferential surface of the cylinder when the compression chamber is compressed. The piston comprises a disc portion disposed on a side of the crankshaft and a retainer disposed in a face-to-face relationship to the disc portion on a side opposite to the crankshaft. The attachment portion of the lip ring is held by the disc portion and the retainer, to thereby fix the lip ring to the piston (for example, see Japanese Patent Public Disclosure No. 9-144666).

In a conventional oscillating type compressor such as that mentioned above, when the piston reciprocates within the cylinder while being oscillated, only two portions of the entire periphery of the lip portion of the lip ring, which portions are located in a direction of oscillation of the piston, are subject to wear by being strongly pressed against the inner circumferential surface of the cylinder. Therefore, a problem of premature fracture of the lip ring occurs, due to wear of the above-mentioned two portions, although the remaining portion of the lip ring is worn by only about 30% of its original thickness. The lip ring is fixedly connected to the disc portion of the piston so as to prevent leakage of air from the compression chamber. Therefore, when the oscillating type compressor is operated, concentrated wear occurs at two portions of the lip portion located in a direction of oscillation of the piston, so that the life of the lip ring becomes short.

SUMMARY OF THE INVENTION

In view of the above, the present invention has been made. It is an object of the present invention to provide an oscillating type compressor wherein wear is distributed around the entire periphery of a lip portion of a lip ring, to thereby prolong the life of the lip ring.

An oscillating type compressor of the present invention comprises: a cylinder; a piston adapted to reciprocate within the cylinder while being oscillated, the piston defining a compression chamber in the cylinder; and a lip ring provided in an outer circumferential portion of the piston, the lip ring being adapted to seal a space between the piston and the cylinder.

In order to achieve the above-mentioned object, in the present invention the lip ring is provided so as to be rotatable in a circumferential direction of the piston.

With this arrangement, since the lip ring is provided so as to be rotatable in a circumferential direction of the piston, portions of the lip ring to be strongly pressed against the inner circumferential surface of the cylinder can be changed. Therefore, wear on the lip ring can be distributed around the entire periphery of the lip ring, thus preventing concentrated wear on only a part of the periphery of the lip ring, and thus prolonging the life of the lip ring.

According to an embodiment of the present invention, a ring attachment groove is formed in an outer circumferential surface of the piston, the ring attachment groove comprising a circumferential recessed groove extending along an entire periphery of the piston and having an opening facing in a radially outward direction of the piston. The lip ring comprises an annular attachment portion rotatably attached to the ring attachment groove, and a lip portion bent from a radially outer portion of the attachment portion towards the compression chamber.

With this arrangement, when the piston reciprocates in the cylinder while being oscillated, during a suction stroke in which a gas is sucked into the compression chamber, the lip ring attached to the ring attachment groove of the piston, which is rotatable in a circumferential direction, is capable of appropriate rotation in the circumferential direction due to the effect of frictional drag caused by contact between the inner circumferential surface of the cylinder and the lip portion. Therefore, during a suction stroke, portions of the lip ring to be strongly pressed against the inner circumferential surface of the cylinder can be changed, according to rotation of the lip ring. Therefore, wear on the lip portion can be distributed around the entire periphery thereof, thus preventing occurrence of concentrated wear on a part of the lip portion and thus prolonging the life of the lip ring.

According to another embodiment of the present invention, a seal portion is provided between the ring attachment groove of the piston and the attachment portion of the lip ring so as to seal a space between the piston and the lip ring.

In this arrangement, the seal portion is provided between the ring attachment groove of the piston and the attachment portion of the lip ring. Therefore, during a compression stroke in which the compression chamber is compressed by means of the piston, the seal portion seals a space between the ring attachment groove of the piston and the attachment portion of the lip ring, due to the action of the pressure in the compression chamber. Thus, it is possible to prevent a gas in the compression chamber from leaking through a space between the ring attachment groove and the attachment portion.

According to a further embodiment of the present invention, the ring attachment groove is formed by a pair of groove wall surfaces and a groove bottom surface, the pair of groove wall surfaces facing each other and extending along the entire periphery of the piston, the groove bottom surface being positioned at innermost portions of the groove wall surfaces. The seal portion comprises an annular rail formed in one groove wall surface of said pair of groove wall surfaces, the lip ring being adapted to be pressed against said one groove wall surface under a pressure in the compression chamber. The seal portion also comprises an annular fitting portion formed in the attachment portion of the lip ring, the fitting portion being adapted to be fitted into the annular rail in a gas-tight manner when the lip ring is pressed against said one groove wall surface.

With this arrangement, during a suction stroke of the piston, the fitting portion of the seal portion formed in the attachment portion of the lip ring can be rotated in a circumferential direction of the piston along the rail formed in the groove wall surface of the ring attachment groove of the piston. Therefore, the seal portion is capable of allowing movement of the lip ring in the circumferential direction, so that wear on the lip portion can be distributed around the entire periphery thereof.

On the other hand, during a compression stroke, the fitting portion of the seal portion can be gas-tightly fitted against the rail, by utilizing the pressure in the compression chamber. Therefore, the seal portion is capable of sealing a space between the groove wall surface of the ring attachment groove and the attachment portion of the lip ring, to thereby prevent leakage of a gas from the compression chamber.

According to a further embodiment of the present invention, the ring attachment groove is formed by a pair of groove wall surfaces and a groove bottom surface, the pair of groove wall surfaces facing each other and extending along the entire periphery of the piston, the groove bottom surface being positioned at innermost portions of the groove wall surfaces. The seal portion comprises a radially inner-side projection formed in a radially inner portion of the attachment portion of the lip ring, the radially inner-side projection being adapted to abut against the groove bottom surface of the ring attachment groove in a gas-tight manner under a pressure in the compression chamber.

With this arrangement, during a suction stroke of the piston, the radially inner-side projection formed in the attachment portion of the lip ring does not make intimate contact with the groove bottom surface of the ring attachment groove of the piston. Therefore, the lip ring is capable of rotating in a circumferential direction of the piston, so that wear on the lip portion can be distributed around the entire periphery of the lip portion.

On the other hand, during a compression stroke, the radially inner-side projection makes intimate contact with the groove bottom surface of the ring attachment groove, due to the action of the pressure in the compression chamber. Therefore, the radially inner-side projection is capable of sealing a space between the groove bottom surface of the ring attachment groove and the attachment portion of the lip ring, thus preventing leakage of a gas from the compression chamber.

According to a further embodiment of the present invention, the ring attachment groove is formed by a pair of groove wall surfaces and a groove bottom surface, the pair of groove wall surfaces facing each other and extending along the entire periphery of the piston, the groove bottom surface being positioned at innermost portions of the groove wall surfaces. The seal portion comprises an annular seal attachment groove formed in either one of the pair of groove wall surfaces and a seal member attached to the seal attachment groove. The seal member is adapted to resiliently abut against the attachment portion of the lip ring.

With this arrangement, since the seal member resiliently abuts against the attachment portion of the lip ring, the lip ring is capable of appropriate rotation in a circumferential direction due to the effect of frictional drag caused by contact between the lip portion and the inner circumferential surface of the cylinder. Further, since the seal member is provided between the groove wall surface of the ring attachment groove and the attachment portion of the lip ring, it is possible to seal a space between the groove wall surface of the ring attachment groove and the attachment portion of the lip ring, thus preventing leakage of a gas from the compression chamber.

According to a further embodiment of the present invention, a dimension of a space in the ring attachment groove is set to be larger than a dimension of a thickness of the attachment portion of the lip ring.

With this embodiment, a space can always be formed between the ring attachment groove and the lip ring, so that the lip ring can be freely rotated relative to the ring attachment groove.

According to a further embodiment of the present invention, the piston comprises a piston body adapted to reciprocate within the cylinder while being oscillated, and a rotatable member provided so as to be rotatable relative to the piston body in a circumferential direction of the piston. The lip ring is fixed to an outer circumferential portion of the rotatable member so as to seal a space between the rotatable member and the cylinder.

With this arrangement, the rotatable member rotatable in a circumferential direction of the piston is attached to the piston body, and the lip ring is fixed to the rotatable member. Therefore, the lip ring can be rotated with the rotatable member in a circumferential direction of the piston, and therefore portions of the lip ring to be strongly pressed against the inner circumferential surface of the cylinder can be changed. As a result, wear on the lip ring can be distributed around the entire periphery of the lip ring, thus preventing occurrence of concentrated wear on a part of the lip ring and prolonging the life of the lip ring.

According to a further embodiment of the present invention, a shaft member is provided in the piston body so as to support the rotatable member in a rotatable state. The rotatable member comprises a ring attachment member including an insertion opening formed in a portion thereof corresponding to the center of rotation, the shaft member being inserted through the insertion opening. The lip ring is fixed to the ring attachment member.

With this arrangement, the ring attachment member is rotatably supported on the piston body through the shaft member. Therefore, the ring attachment member can be rotated about the shaft member, and the lip ring can be rotated with the ring attachment member in a circumferential direction of the piston.

According to a further embodiment of the present invention, a first seal portion is provided between the ring attachment member and the shaft member so as to seal a space therebetween, and a second seal portion is provided between the ring attachment member and the piston body so as to seal a space therebetween.

With this arrangement, the first seal portion is provided between the ring attachment member and the shaft member, while the second seal portion is provided between the ring attachment member and the piston body. Therefore, it is possible to provide a gas-tight seal between the ring attachment member and the shaft member and between the ring attachment member and the piston body. Therefore, it is possible to prevent a gas in the compression chamber from leaking through a space between the ring attachment member and the shaft member or through a space between the ring attachment member and the piston body.

According to a further embodiment of the present invention, a bearing is provided between the ring attachment member and the shaft member.

In this arrangement, since the bearing is provided between the ring attachment member and the shaft member, it is possible to prevent rattling of the ring attachment member and occurrence of wear between the ring attachment member and the shaft member, by means of the bearing.

DETAILED DESCRIPTION OF THE INVENTION

Hereinbelow, embodiments of the present invention are described in detail, referring to the accompanying drawings.

Figure 1:
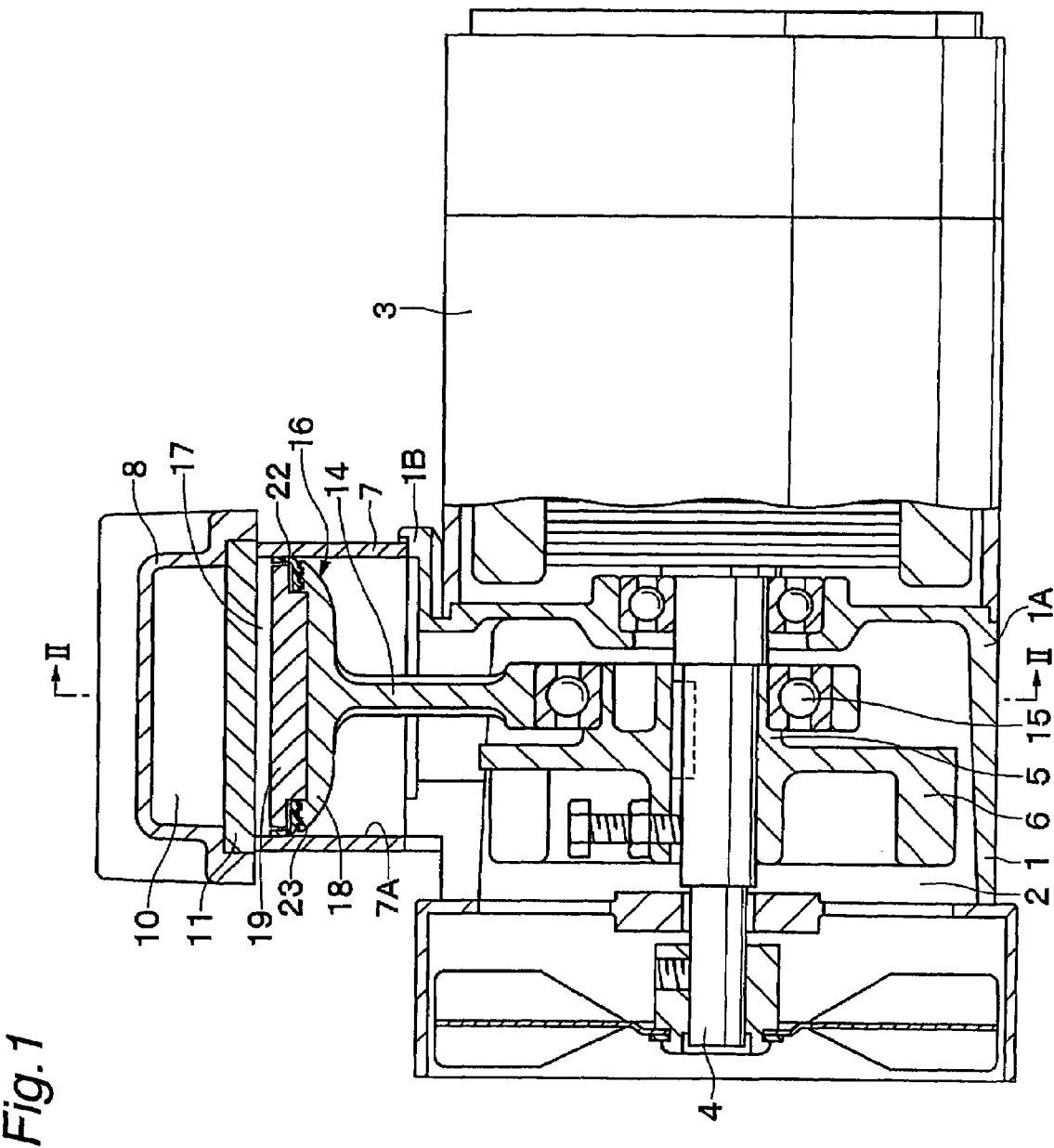
FIG. 1 is a cross-sectional view showing an oscillating type compressor according to a first embodiment of the present invention.
Figure 2:
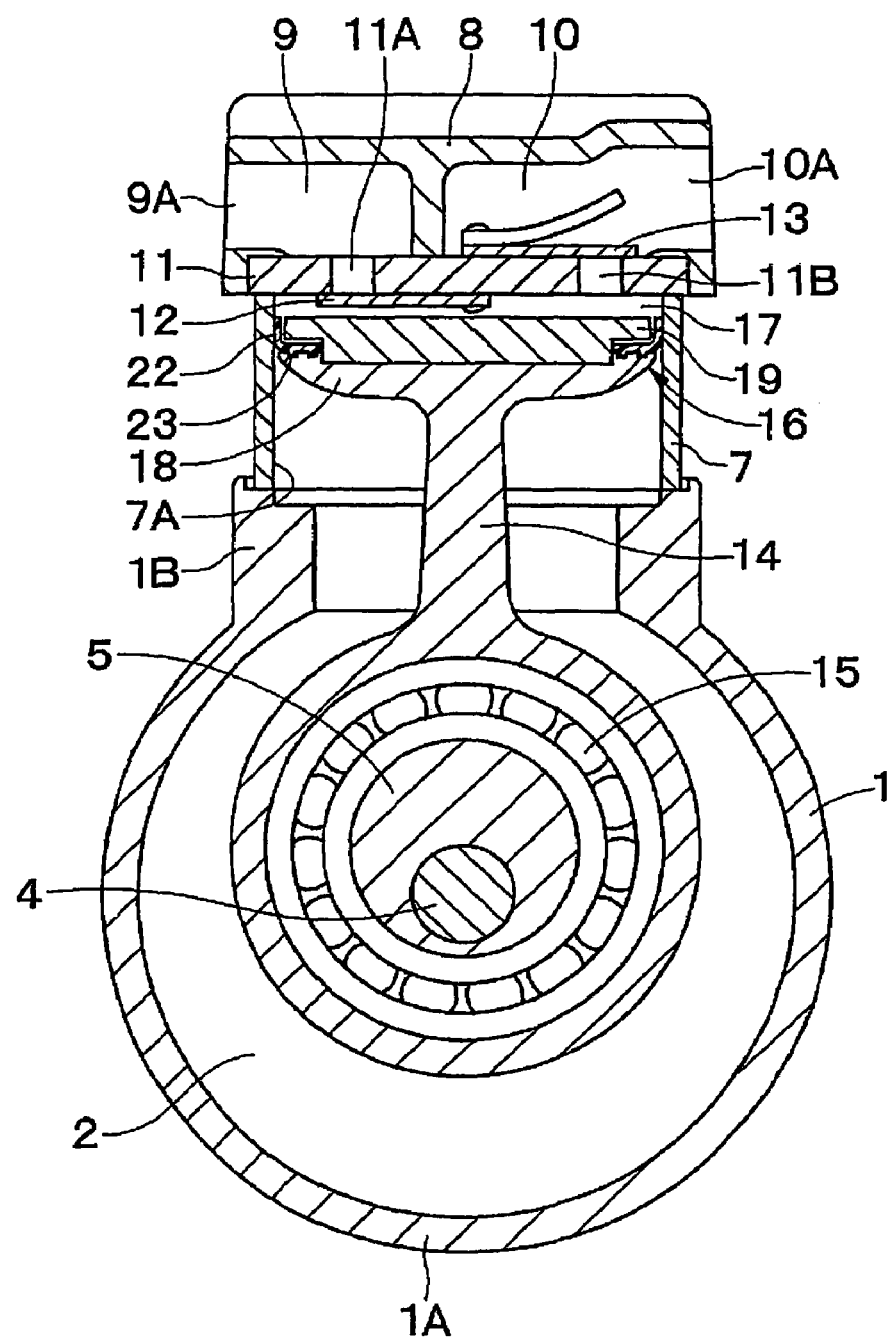
FIG. 2 is a cross-sectional view of the oscillating type compressor, taken along the line II-II in FIG. 1.

FIGS. 1 to 5 show a first embodiment of the present invention. In FIG. 1, reference numeral 1 denotes a crank case of an oscillating type compressor. The crank case 1 defines a crank chamber 2 formed therein. As shown in FIGS. 1 and 2, the crank case 1 comprises a cylindrical case portion 1A having an axis thereof disposed in a horizontal direction and a cylinder mounting seat 1B formed in an upper portion of the case portion 1A. A crankshaft 5, which is disposed in the crank chamber 2 and fixed to an output shaft 4 of an electric motor 3, is rotatably supported by the case portion 1A. A balance weight 6 is formed as an integral part of the crankshaft 5.

Figure 3:
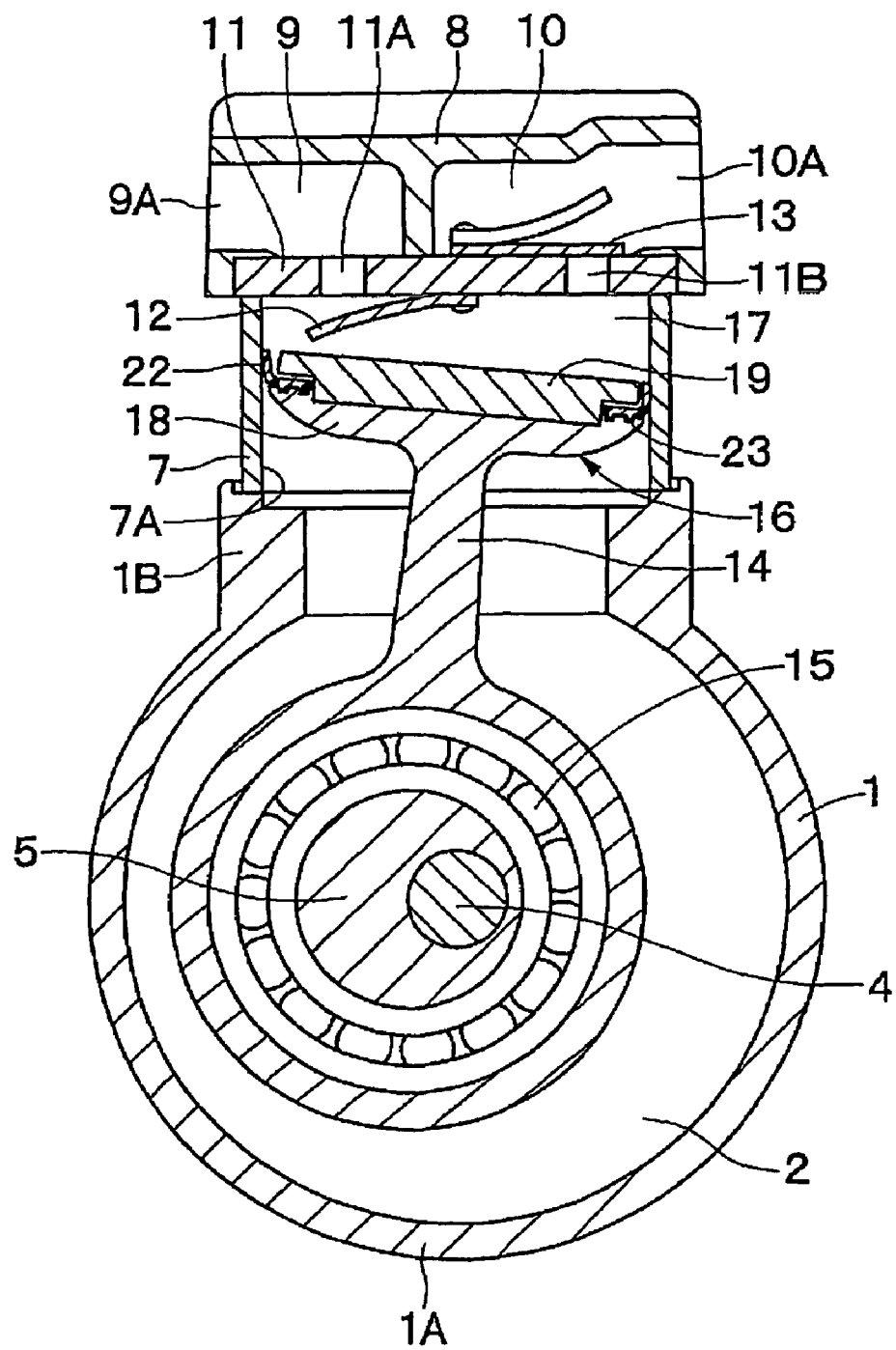
FIG. 3 is a cross-sectional view, corresponding to FIG. 2, of the oscillating type compressor when a piston reciprocally moves while being oscillated.

Reference 7 denotes a circular cylinder mounted on the cylinder mounting seat 1B of the crank case 1. A base end portion of the cylinder 7 opens into the crank chamber 2, and an inner circumferential surface 7A of the cylinder 7 forms a slide surface on which a lip ring 22 (described later) slides. A cylinder head 8 is mounted on a distal end portion of the cylinder 7. As shown in FIGS. 2 and 3, a suction chamber 9 into which external air is sucked through a suction opening 9A, and a discharge chamber 10 from which compressed air is discharged through a discharge opening 10A, are defined in the cylinder head 8.

Reference numeral 11 denotes a valve seat plate held between the cylinder 7 and the cylinder head 8. The valve seat plate 11 includes a suction port 11A for communicating the suction chamber 9 with a compression chamber 17 (described later) and a discharge port 11B for communicating the discharge chamber 10 with the compression chamber 17. A suction valve 12 and a discharge valve 13, as reed valves, are attached to the valve seat plate 11. A base end of each of the suction valve 12 and the discharge valve 13 is fixed to the valve seat plate 11 using screws. Distal ends of the suction valve 12 and the discharge valve 13 are made free, and open or close the suction port 11A and the discharge port 11B, respectively.

Reference numeral 14 denotes a piston rod having a base end portion thereof rotatably connected to the crankshaft 5 through a bearing 15. A distal end portion of the piston rod 14 extends into the cylinder 7. A piston 16 (described later) is formed in the distal end portion of the piston rod 14. The piston rod 14 enables the piston 16 to reciprocate within the cylinder 7 while being oscillated.

Figure 4:
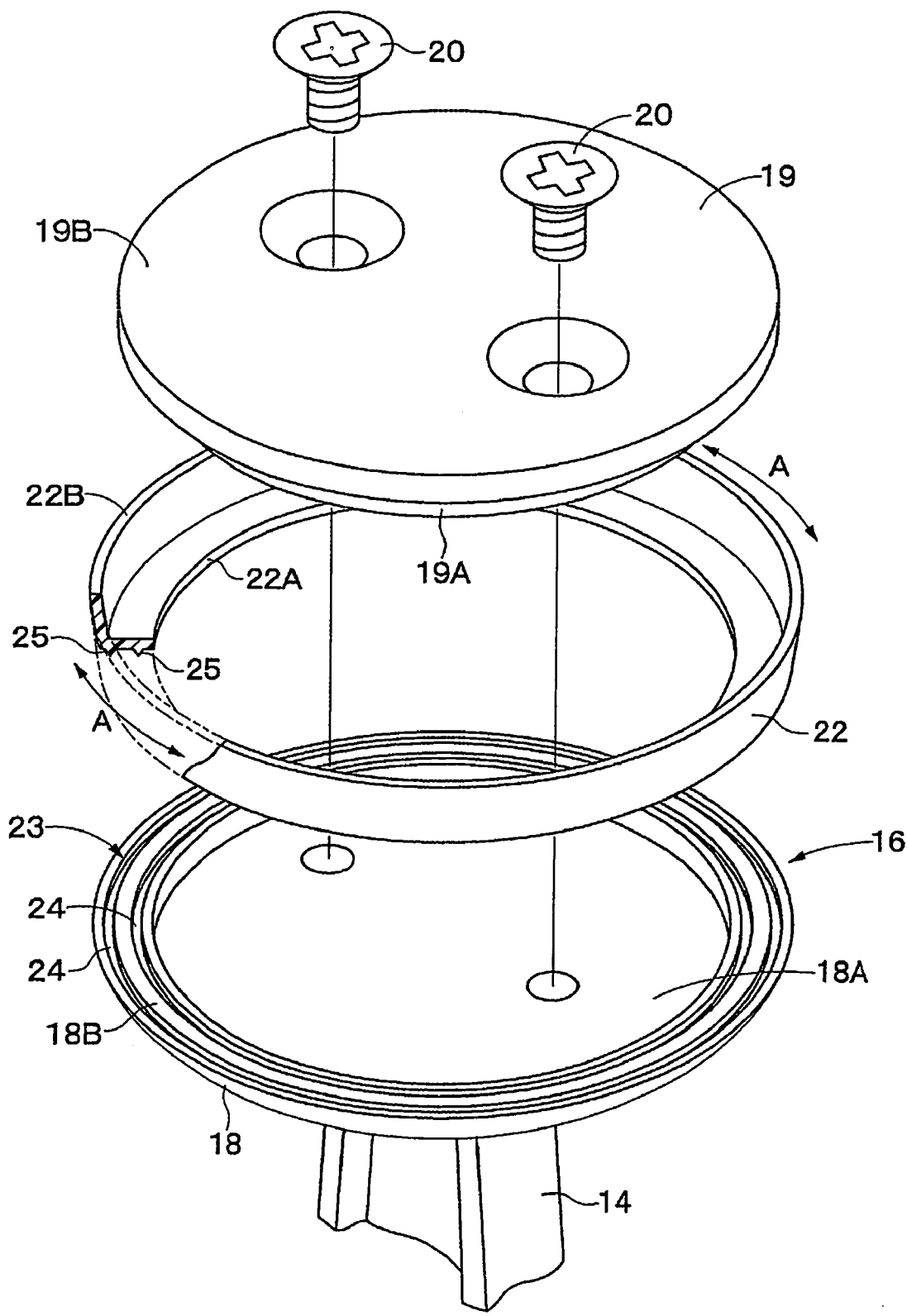
FIG. 4 is a partially cut-away enlarged perspective view of the piston and a lip ring in a disassembled state.

The piston 16 is an oscillating type piston slidably provided in the cylinder 7. As shown in FIG. 3, the piston 16 reciprocates within the cylinder 7 while being oscillated. The compression chamber 17 is defined between the piston 16 and the valve seat plate 11 in the cylinder 7. As shown in FIG. 4, the piston 16 comprises a piston body 18, a retainer 19, a ring attachment groove 21, etc. as described later.

The piston body 18 is in the form of a disc forming a lower portion of the piston 16. The distal end portion of the piston rod 14 is integrally connected to a central portion of a lower surface of the piston body 18. A fitting recess 18A, into which a small-diameter portion 19A (described later) of the retainer 19 is fitted, is formed in a central portion of an upper surface of the piston body 18. A circumferential projection 18B extends along the entire outer periphery of the fitting recess 18A. An upper surface of the circumferential projection 18B of the piston body 18 forms a lower groove wall surface 21A (described later) of the ring attachment groove 21.

The retainer 19 is provided on an upper side of the piston body 18. The retainer 19 is removably connected to the piston body 18 by means of bolts 20, so as to allow the lip ring 22 to be attached to or detached from the piston 16. The retainer 19 has a stepped disc-like configuration comprising the small-diameter portion 19A fitted into the fitting recess 18A of the piston body 18, and a large-diameter portion 19B having a large diameter and provided on an upper side of the small-diameter portion 19A. A lower surface of the large-diameter portion 19B of the retainer 19 forms an upper groove wall surface 21B (described later) of the ring attachment groove 21.

Figure 5:
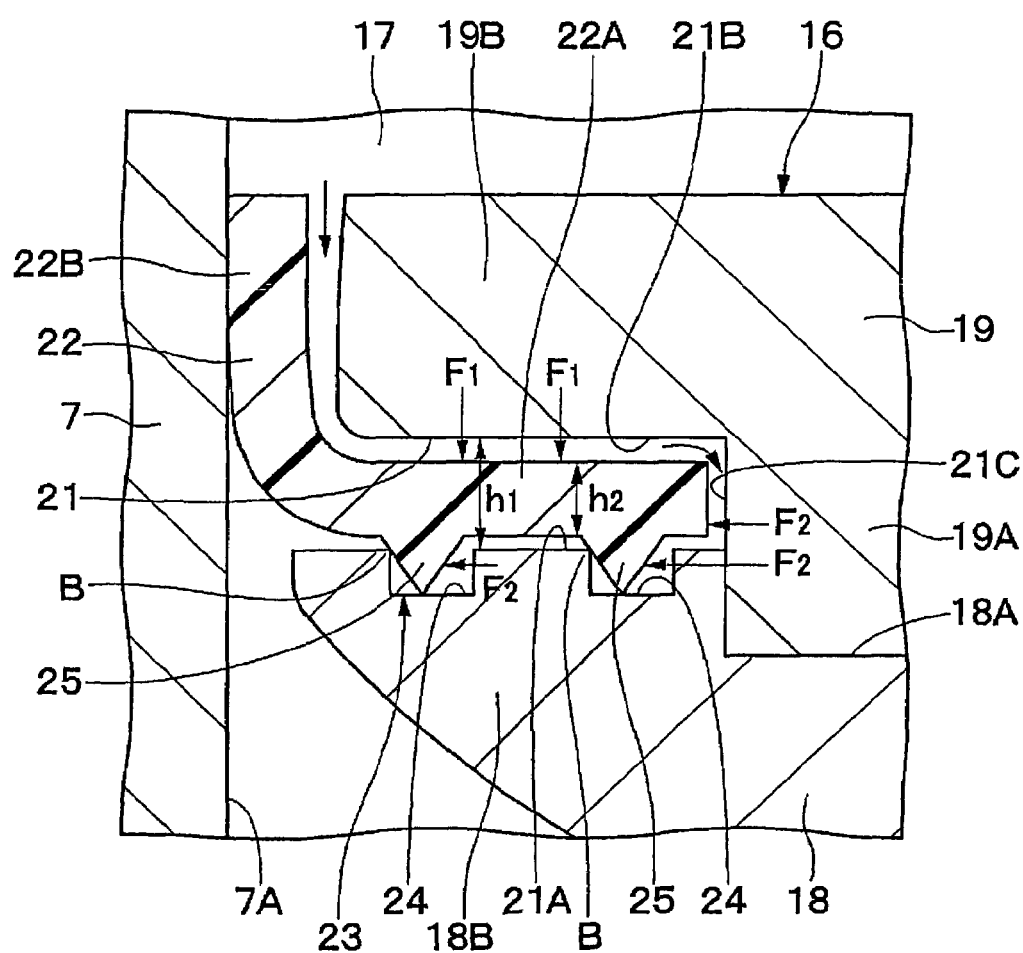
FIG. 5 is an enlarged cross-sectional view of an essential part of the present invention, showing the piston, the lip ring, a seal portion, etc. in the first embodiment.

As shown in FIG. 5, the ring attachment groove 21 is formed in an outer circumferential portion of the piston 16. An attachment portion 22A (described later) of the lip ring 22 is attached to the ring attachment groove 21 in a manner such that the attachment portion 22A is capable of rotating in a circumferential direction of the piston 16. The ring attachment groove 21 is formed as a circumferential recessed groove between the piston body 18 and the retainer 19 so as to extend along the entire periphery of the piston 16. The ring attachment groove 21 has a narrow opening facing in a radially outward direction of the piston 16.

Specifically, the ring attachment groove 21 comprises the lower groove wall surface 21A in an annular form formed by the upper surface of the circumferential projection 18B of the piston body 18, the upper groove wall surface 21B in an annular form formed by the lower surface of the large-diameter portion 19B of the retainer 19 so as to face the lower groove wall surface 21A in a vertical direction, and a groove bottom surface 21C positioned at innermost portions of the lower and upper groove wall surfaces 21A and 21B and formed by an outer circumferential surface of the small-diameter portion 19A of the retainer 19.

In the ring attachment groove 21, a dimension h1 of a space as a distance between the lower groove wall surface 21A and the upper groove wall surface 21B is set to be larger than a dimension h2 of a thickness of the attachment portion 22A of the lip ring 22 (h1>h2). Therefore, a space can always be formed between the ring attachment groove 21 and the lip ring 22, so that the lip ring 22 is capable of freely rotating in a circumferential direction of the piston 16. Further, the distance between the lower groove wall surface 21A and the upper groove wall surface 21B of the ring attachment groove 21 is such that detachment of peak-shaped fitting projections 25 from rectangular groove rails 24 is prevented (the peak-shaped fitting projections 25 and the rectangular groove rails 24 are described later).

The lip ring 22 is provided in the outer circumferential portion of the piston 16. The lip ring 22 provides a seal between the piston 16 and the cylinder 7, to thereby prevent leakage of air (pressure) from the compression chamber 17. The lip ring 22 is made of, for example, a resin material having anti-wear properties or self-lubricating properties. It is formed as a seal ring having an L-shaped cross-section.

Illustratively stated, the lip ring 22 comprises the attachment portion 22A formed as a flat circular ring-shaped plate, which is located at a radially inner position, and a lip portion 22B bent from a radially outer portion of the attachment portion 22A. The lip portion 22B upwardly extends towards the compression chamber 17, while being diametrically enlarged, namely diverging, so as to make slidable contact with the inner circumferential surface 7A of the cylinder 7. The attachment portion 22A of the lip ring 22 is attached to the ring attachment groove 21 of the piston 16 with a space being formed therebetween.

The dimension h2 of the thickness of the attachment portion 22A is set to be smaller than the dimension h1 of the space in the ring attachment groove 21. Therefore, the attachment portion 22A is not fixed within the ring attachment groove 21 of the piston 16, and does not make such contact that will impede its movement. Therefore, when a pressure in the compression chamber 17 does not act, the attachment portion 22A is capable of freely rotating relative to the piston 16 in a circumferential direction of the piston 16 (either of the directions indicated by a double-headed arrow A in FIG. 4). Therefore, during reciprocal movement of the piston 16, the lip ring 22 is capable of rotating appropriately in a circumferential direction of the piston 16, due to the effect of frictional drag caused by frictional contact between the lip portion 22B and the inner circumferential surface 7A of the cylinder 7, the pressure in the compression chamber 17, etc.

Reference numeral 23 denotes a seal portion provided between the ring attachment groove 21 of the piston 16 and the attachment portion 22A of the lip ring 22. During a compression stroke in which the compression chamber 17 is compressed, the seal portion 23 serves to prevent air in the compression chamber 17 from leaking through a space between the piston 16 and the lip ring 22. The seal portion 23 comprises the rectangular groove rails 24 formed in the piston 16 and the peak-shaped fitting projections 25 formed in the lip ring 22.

Reference numeral 24 denotes two rectangular groove rails formed in the lower groove wall surface 21A of the ring attachment groove 21. The rectangular groove rails 24 extend in a circular ring-like configuration, so as to form two concentric circles. Each of the rectangular groove rails 24 is formed as a rectangular recessed groove having a rectangular C-shaped cross-section with an opening thereof facing upward.

Reference numeral 25 denotes two peak-shaped fitting projections as fitting portions formed in the lower surface of the attachment portion 22A of the lip ring 22. The peak-shaped fitting projections 25 are concentrically disposed in a manner such that each of the peak-shaped fitting projections 25 is disposed in a radially outer position in the corresponding rectangular groove rail 24. Each of the peak-shaped fitting projections 25 is formed as a projection having a peak-shaped cross-section projecting downward.

In the seal portion 23 thus arranged, during a suction stroke in which the piston 16 is moved downward so as to suck air into the compression chamber 17, the peak-shaped fitting projections 25 of the lip ring 22 can be freely rotated in a circumferential direction of the piston 16 along the rectangular groove rails 24 of the piston 16.

On the other hand, during a compression stroke in which the piston 16 is moved upward so as to compress the compression chamber 17, the lip ring 22 is pressed towards the piston body 18 due to the effect of pressure in the compression chamber 17, so that the peak-shaped fitting projections 25 can be pressed against the rectangular groove rails 24, to thereby seal a space between the piston 16 and the lip ring 22 in a gas-tight manner.

Specifically, the pressure in the compression chamber 17 acts on the attachment portion 22A of the lip ring 22 in a direction indicated by arrows F1. Therefore, the peak-shaped fitting projections 25 formed in the attachment portion 22A can be pressed from the upper side against the rectangular groove rails 24. In addition, as indicated by arrows F2, the pressure in the compression chamber 17 acts on the lip ring 22 to press the two peak-shaped fitting projections 25 from the radially inner side against the rectangular groove rails 24. Thus, inclined surfaces of the peak-shaped fitting projections 25 are pressed against corner portions B of open ends of the rectangular groove rails 24. Therefore, the seal portion 23 is capable of functioning as a labyrinth seal with high sealing performance.

The oscillating type compressor in this embodiment is arranged as mentioned above. Next, an operation of this oscillating type compressor is described.

When the motor 3 is operated, as shown in FIG. 3, the piston 16 reciprocally moves within the cylinder 7 while being oscillated. Under this movement of the piston 16, the compressor repeats a suction stroke in which air is sucked from the suction chamber 9 into the compression chamber 17, and a compression stroke in which air in the compression chamber 17 is compressed and discharged into the discharge chamber 10, to thereby supply compressed air into an external air tank (not shown).

The piston 16 of an oscillating type is oscillated in a certain direction in the cylinder 7 while reciprocating in the cylinder 7. Therefore, only a part of the lip portion 22B of the lip ring 22 located in a direction of oscillation of the piston 16 (the portions indicated as left-side and right-side end portions in FIG. 1) is likely to be subject to wear.

In the first embodiment of the present invention, the dimension h1 of the space in the ring attachment groove 21 is set to be larger than the dimension h2 of the thickness of the attachment portion 22A of the lip ring 22, to thereby enable the lip ring 22 provided in the piston 16 to be freely rotatable relative to the piston 16 in a circumferential direction of the piston 16. Consequently, during a suction stroke in which air is sucked into the compression chamber 17, the lip ring 22 is capable of rotating appropriately in a circumferential direction due to the effect of frictional drag caused by contact between the lip ring 22 and the inner circumferential surface 7A of the cylinder 7, the pressure in the compression chamber 17, etc. Thus, wear on the lip portion 22B can be distributed around the entire periphery of the lip portion 22B due to changing of the portions of the lip portion 22B located in the direction of oscillation of the piston 16.

Further, since the seal portion 23 is provided between the ring attachment groove 21 of the piston 16 and the attachment portion 22A of the lip ring 22, it is possible to prevent leakage of air from the compression chamber 17 during a compression stroke in which the compression chamber 17 is compressed.

As a result, while a compression stroke can be reliably effected without the risk of leakage of compressed air, occurrence of concentrated wear on a part of the lip portion 22B of the lip ring 22 can be prevented, thus prolonging the life of the lip ring 22.

Further, the seal portion 23 comprises the rectangular groove rails 24 formed in the lower groove wall surface 21A of the ring attachment groove 21 of the piston 16 and the peak-shaped fitting projections 25 formed in the attachment portion 22A of the lip ring 22, the peak-shaped fitting projections 25 being adapted to be fitted into the rectangular groove rails 24 in a gas-tight manner. Therefore, during a suction stroke, the peak-shaped fitting projections 25 can be rotated along the rectangular groove rails 24 in a circumferential direction of the piston 16, thus allowing rotation of the lip ring 22 in the circumferential direction.

During a compression stroke, by utilizing the pressure in the compression chamber 17 acting on the lip ring 22, the peak-shaped fitting projections 25 can be strongly pressed against the rectangular groove rails 24, to thereby provide a gas-tight fit, thus reliably sealing a space between the piston 16 and the lip ring 22 and increasing compression performance.

Further, the seal portion 23 comprises the rectangular groove rails 24 having rectangular C-shaped cross-sections and the peak-shaped fitting projections 25 having peak-shaped cross-sections. Therefore, by pressing the inclined surfaces of the peak-shaped fitting projections 25 against the corner portions B of the open ends of the corresponding rails 24, high sealing performance using a simple arrangement can be achieved.

Further, the seal portion 23 is formed by disposing two combinations of the rectangular groove rail 24 and the peak-shaped fitting projection 25 so as to form two concentric circles. Therefore, a double seal can be provided, thus improving sealing performance due to the labyrinth effect.

Figure 6:
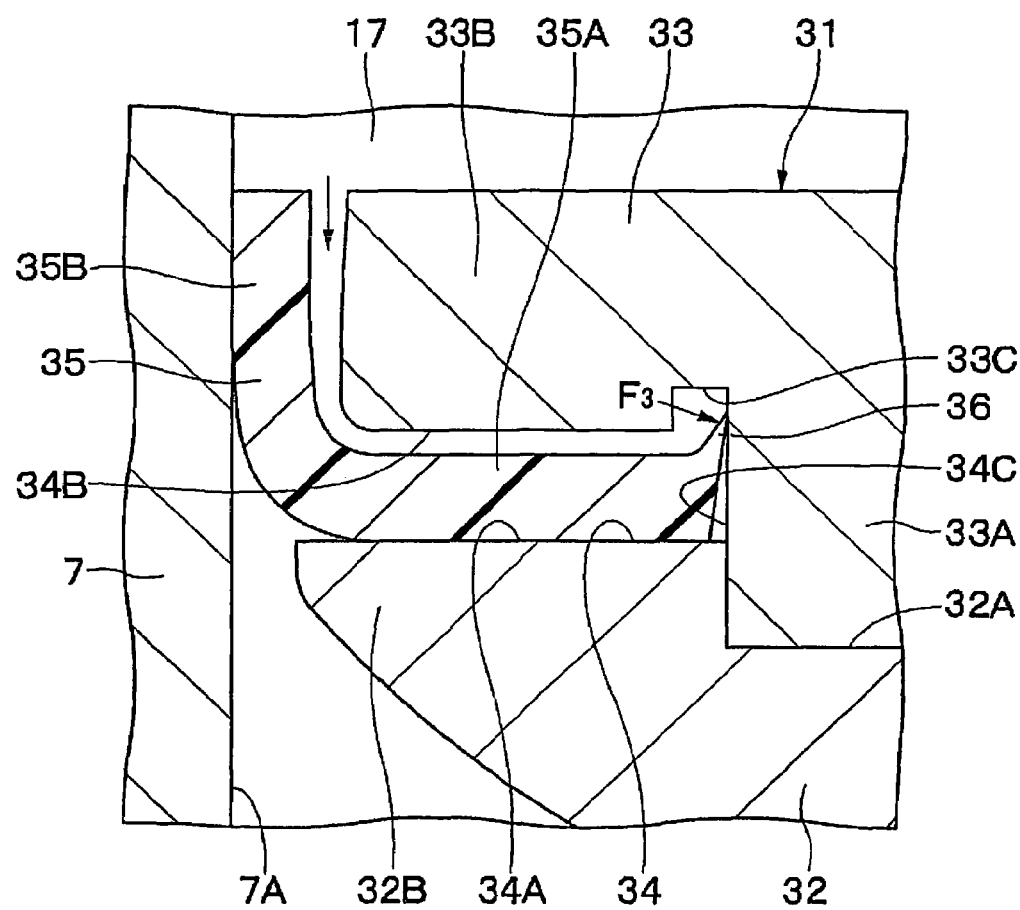
FIG. 6 is an enlarged cross-sectional view of an essential part of the present invention, showing a piston, a lip ring, a radially inner-side projection, etc. in a second embodiment of the present invention.

Next, FIG. 6 shows a second embodiment of the present invention. A characteristic feature of this embodiment is that the seal portion comprises a radially inner-side projection, which is formed in a radially inner portion of the lip ring attachment portion and which is adapted to abut against the groove bottom surface of the ring attachment groove in a gas-tight manner when a pressure in the compression chamber is applied. In the second embodiment, the same elements as used in the first embodiment are indicated by the same reference numerals, and explanation thereof is omitted.

In FIG. 6, reference numeral 31 denotes a piston in the second embodiment. The piston 31 comprises a piston body 32 including a fitting recess 32A and a circumferential projection 32B extending along the entire periphery of the fitting recess 32A. The piston 31 further comprises a retainer 33 provided in a face-to-face relationship to the piston body 32. The retainer 33 has a stepped circular disc-like configuration formed by a small-diameter portion 33A and a large-diameter portion 33B. The retainer 33 includes an annular pocket 33C, which is formed at a root portion of the small-diameter portion 33A and accommodates a distal end of a radially inner-side projection 36 (described later).

Reference numeral 34 denotes a ring attachment groove formed in an outer circumferential portion of the piston 31. An attachment portion 35A of a lip ring 35 (described later) is rotatably attached to the ring attachment groove 34. Substantially as in the case of the ring attachment groove 21 in the first embodiment, the ring attachment groove 34 comprises a lower groove wall surface 34A formed in the piston body 32, an upper groove wall surface 34B formed in the retainer 33, and a groove bottom surface 34C positioned at innermost portions of the lower and upper groove wall surfaces 34A and 34B. The groove bottom surface 34C merges into the pocket 33C.

The lip ring 35 in the second embodiment is rotatably provided in the outer circumferential portion of the piston 31. During a compression stroke, the lip ring 35 serves to seal a space between the piston 31 and the cylinder 7. The lip ring 35 comprises the attachment portion 35A formed by a circular ring-like plate attached to the ring attachment groove 34 and a lip portion 35B formed in a radially outer portion of the attachment portion 35A and adapted to make slidable contact with the inner circumferential surface 7A of the cylinder 7.

The radially inner-side projection 36 is provided as a seal portion formed in an inner circumferential portion of the lip ring 35. The radially inner-side projection 36 is formed as a lip portion extending upwardly from a radially inner portion of the attachment portion 35A of the lip ring 35 while being inclined inward. The distal end of the radially inner-side projection 36 extends into the pocket 33C. During a suction stroke, the radially inner-side projection 36 is slightly separated from or makes slight contact with the groove bottom surface 34C of the ring attachment groove 34, and therefore does not prevent rotation of the lip ring 35. During a compression stroke, as indicated by an arrow F3, the radially inner-side projection 36 receives the pressure in the compression chamber 17 and makes intimate contact with the groove bottom surface 34C of the ring attachment groove 34, thus exerting sealing performance.

Thus, in the second embodiment, substantially the same effect as obtained in the first embodiment can be obtained.

Especially, in the second embodiment, the radially inner-side projection 36 as a seal portion is formed as an integral part of the radially inner portion of the lip ring 35. Therefore, the sealing structure becomes simplified, which leads to increased productivity and reduced cost.

Figure 7:
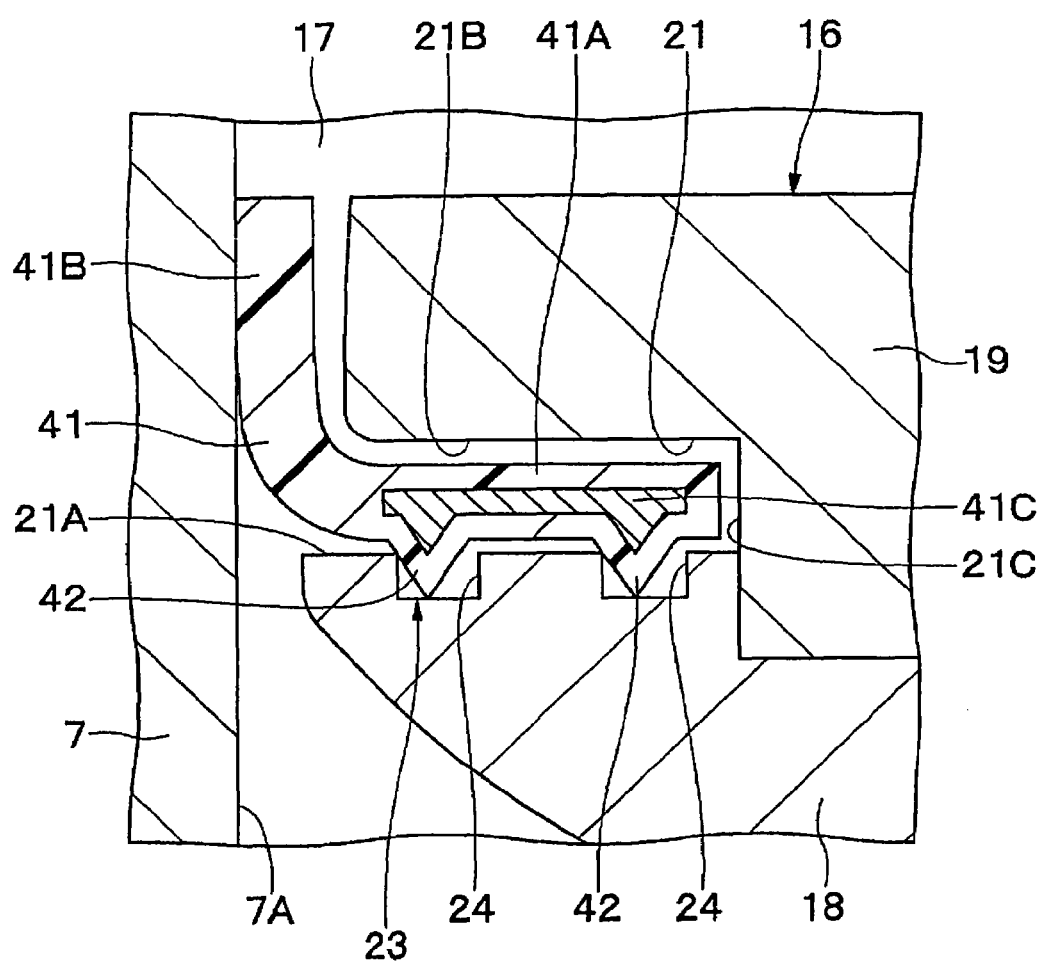
FIG. 7 is an enlarged cross-sectional view of an essential part of the present invention, showing a piston, a lip ring, a seal portion, etc. in a third embodiment.

FIG. 7 shows a third embodiment of the present invention. The third embodiment is characterized in that a metal core member is provided in the attachment portion of the lip ring. In the third embodiment, the same elements as used in the first embodiment are indicated by the same reference numerals, and explanation thereof is omitted.

In FIG. 7, reference numeral 41 denotes a lip ring in the third embodiment. Substantially as in the case of the lip ring 22 in the first embodiment, the lip ring 41 comprises an attachment portion 41A in the form of a circular ring-like plate and a lip portion 41B provided in a radially outer portion of the attachment portion 41A. Two peak-shaped fitting projections 42 are formed on a lower surface of the attachment portion 41A.

The lip ring 41 in the third embodiment differs from the lip ring 22 in the first embodiment in that a core member 41C made of a metal material is formed in the attachment portion 41A by means of molding. The core member 41C serves to prevent the attachment portion 41A from deforming or corrugating.

Thus, substantially the same effects as obtained in the first embodiment can be exerted in the third embodiment. Especially, in the third embodiment, deformation of the attachment portion 41A can be suppressed by means of the core member 41C. Therefore, smooth rotation of the lip ring 41 can be ensured by preventing the attachment portion 41A and the ring attachment groove 21 from making contact with each other. Further, the peak-shaped fitting projections 42 are capable of reliably making intimate contact with the rectangular groove rails 24, so that high sealing performance can be obtained.

Figure 8:
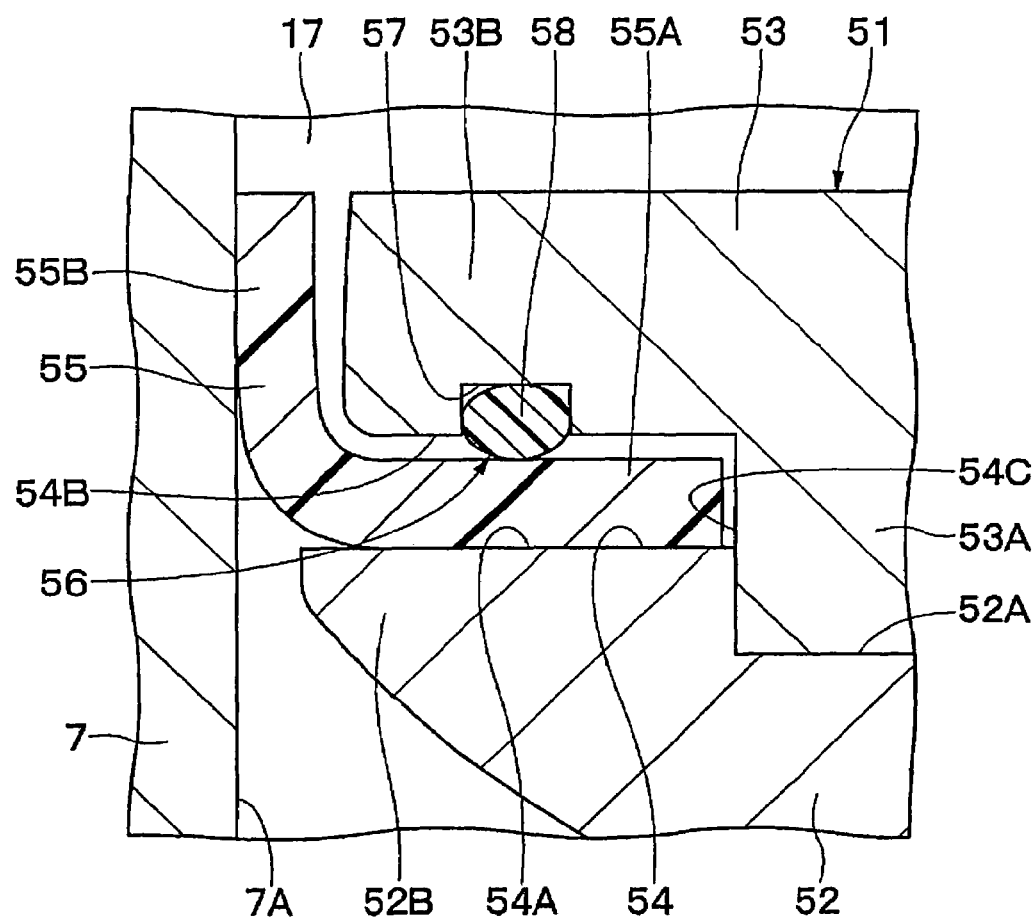
FIG. 8 is an enlarged cross-sectional view of an essential part of the present invention, showing a piston, a lip ring, a seal portion, etc. in a fourth embodiment.

Next, FIG. 8 shows a fourth embodiment of the present invention. This embodiment is characterized in that the seal portion comprises an annular seal attachment groove formed in the groove wall surface, and a seal member attached to the seal attachment groove and adapted to resiliently abut against the attachment portion of the lip ring. In the fourth embodiment, the same elements as used in the first embodiment are indicated by the same reference numerals, and explanation thereof is omitted.

In FIG. 8, reference numeral 51 denotes a piston in the fourth embodiment. The piston 51 comprises a piston body 52 including a fitting recess 52A and a circumferential projection 52B extending along the entire periphery of the fitting recess 52A, and a retainer 53 provided in a face-to-face relationship to the piston body 52. The retainer 53 has a stepped circular disc-like configuration formed by a small-diameter portion 53A and a large-diameter portion 53B.

Reference numeral 54 denotes a ring attachment groove provided in an outer circumferential portion of the piston 51. An attachment portion 55A of a lip ring 55 (described later) is rotatably attached to the ring attachment groove 54. Substantially as in the case of the ring attachment groove 21 in the first embodiment, the ring attachment groove 54 comprises a lower groove wall surface 54A formed in the piston body 52, an upper groove wall surface 54B formed in the retainer 53 and a groove bottom surface 54C positioned at innermost portions of the lower and upper groove wall surfaces 54A and 54B.

The lip ring 55 in the fourth embodiment is rotatably provided in the outer circumferential portion of the piston 51. The lip ring 55 is adapted to seal a space between the piston 51 and the cylinder 7. The lip ring 55 includes the attachment portion 55A in the form of a circular ring-like plate attached to the ring attachment groove 54, and a lip portion 55B provided in a radially outer portion of the attachment portion 55A and adapted to make slidable contact with the inner circumferential surface 7A of the cylinder 7.

Reference numeral 56 denotes a seal portion provided between the ring attachment groove 54 of the piston 51 and the attachment portion 55A of the lip ring 55. The seal portion 56 serves to prevent air in the compression chamber 17 from leaking through a space between the piston 51 and the lip ring 55. The seal portion 56 comprises a seal attachment groove 57 (described later) formed in the piston 51 and an O-ring 58 attached to the seal attachment groove 57.

The seal attachment groove 57 is a single seal attachment groove formed in the upper groove wall surface 54B of the ring attachment groove 54. The seal attachment groove 57 extends in a circular ring-like configuration along the outer periphery of the retainer 53. The seal attachment groove 57 is formed as a rectangular recessed groove having a rectangular C-shaped cross-section with an opening facing downward.

The O-ring 58 as a seal member is attached to the seal attachment groove 57. The O-ring 58 is in a circular ring-like form and is made of an elastic resin material. The O-ring 58 resiliently abuts against an upper surface of the attachment portion 55A of the lip ring 55, to thereby prevent air in the compression chamber 17 from leaking through a space between the piston 51 and the lip ring 55. Further, the O-ring 58 serves to press the lip ring 55 against the piston body 52, to thereby apply a force to prevent rotation of the lip ring 55. However, the O-ring 58 does not completely stop the rotation of the lip ring 55. When a large torque acts on the lip ring 55, for example, during start-up of the compressor, the O-ring 58 permits rotation of the lip ring 55.

Thus, in the fourth embodiment, substantially the same effects as obtained in the first embodiment can be exerted. Especially, in the fourth embodiment, the O-ring 58 is provided between the upper groove wall surface 54B of the ring attachment groove 54 and the attachment portion 55A of the lip ring 55. Therefore, the O-ring 58 is capable of sealing a space between the upper groove wall surface 54B of the ring attachment groove 54 and the attachment portion 55A of the lip ring 55, to thereby prevent leakage of air from the compression chamber 17.

Further, the O-ring 58 resiliently abuts against the attachment portion 55A of the lip ring 55. Therefore, during a compression stroke and a suction stroke, rotation of the lip ring 55 can be suppressed, and rotational displacement of the lip ring 55 is permitted only when a large torque acts on the lip ring 55. Consequently, excessive rotation of the lip ring 55 can be prevented, to thereby reduce wear which occurs due to rotation of the lip ring 55, thus increasing reliability.

In the fourth embodiment, the seal attachment groove 57 is formed in the upper groove wall surface 54B of the ring attachment groove 54. However, the seal attachment groove 57 may be formed in the lower groove wall surface 54A of the ring attachment groove 54.

Figure 9:
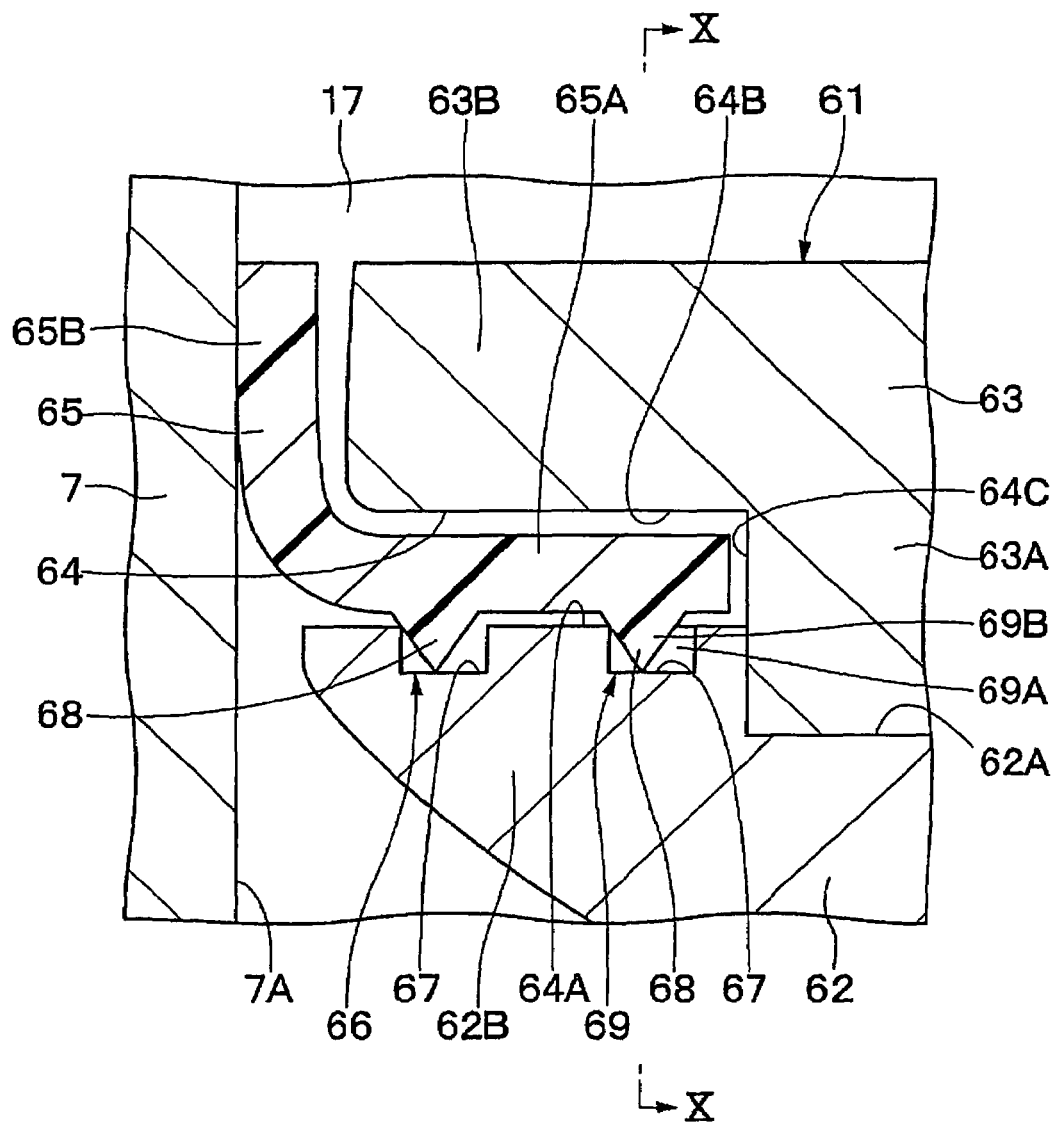
FIG. 9 is an enlarged cross-sectional view of an essential part of the present invention, showing a piston, a lip ring, a seal portion, etc. in a fifth embodiment.
Figure 10:
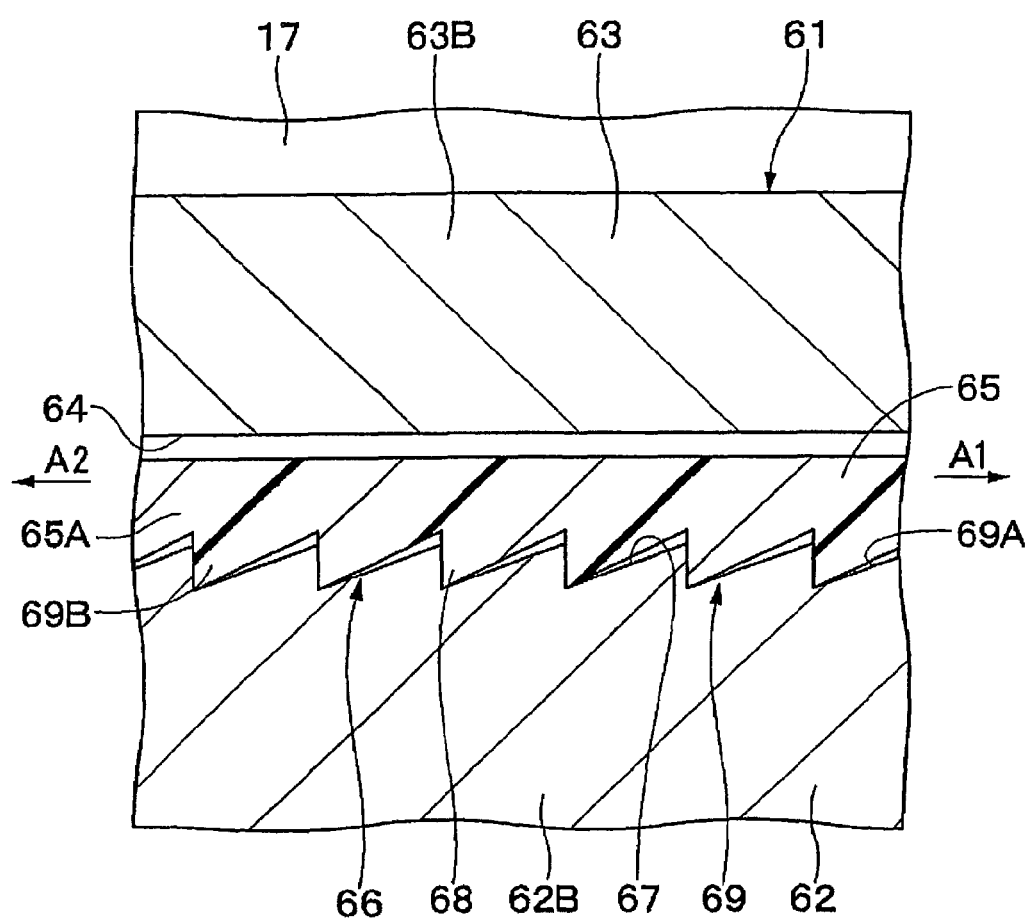
FIG. 10 is an enlarged cross-sectional view of an essential part of the present invention, showing the piston, the lip ring, the seal portion, etc., taken along the line X-X in FIG. 9.

Next, FIGS. 9 and 10 denote a fifth embodiment of the present invention. This embodiment is characterized in that rotation of the lip ring is permitted in only one of circumferential directions of the piston. In the fifth embodiment, the same elements as used in the first embodiment are indicated by the same reference numerals, and explanation thereof is omitted.

In FIGS. 9 and 10, reference numeral 61 denotes a piston used in the fifth embodiment. The piston 61 comprises a piston body 62 including a fitting recess 62A and a circumferential projection 62B extending along the entire periphery of the fitting recess 62A. The piston 61 further comprises a retainer 63 provided in a face-to-face relationship to the piston body 62. The retainer 63 has a stepped disc-like configuration formed by a small-diameter portion 63A and a large-diameter portion 63B.

Reference numeral 64 denotes a ring attachment groove provided in an outer circumferential portion of the piston 61. An attachment portion 65A of a lip ring 65 (described later) is rotatably attached to the ring attachment groove 64. Substantially as in the case of the ring attachment groove 21 in the first embodiment, the ring attachment groove 64 comprises a lower groove wall surface 64A formed in the piston body 62, an upper groove wall surface 64B formed in the retainer 63 and a groove bottom surface 64C positioned at innermost portions of the lower and upper groove wall surfaces 64A and 64B.

The lip ring 65 in the fifth embodiment is rotatably provided in the outer circumferential portion of the piston 61. Substantially as in the case of the lip ring 22 in the first embodiment, the lip ring 65 comprises the attachment portion 65A formed by a circular ring-shaped plate attached to the ring attachment groove 64, and a lip portion 65B formed in a radially outer portion of the attachment portion 65A and adapted to make slidable contact with the inner circumferential surface 7A of the cylinder 7. The lip ring 65 seals a space between the piston 61 and the cylinder 7. By means of a ratchet mechanism 69 (described later), the lip ring 65 is adapted to rotate in only one of circumferential directions of the piston 61.

Reference numeral 66 denotes a seal portion provided between the ring attachment groove 64 of the piston 61 and the attachment portion 65A of the lip ring 65. During a compression stroke in which the compression chamber 17 is compressed, the seal portion 66 serves to prevent air in the compression chamber 17 from leaking through the space between the piston 61 and the lip ring 65. Substantially as in the case of the seal portion 23 in the first embodiment, the seal portion 66 comprises rectangular groove rails 67 (described later) formed in the piston 61 and peak-shaped fitting projections 68 formed in the lip ring 65.

The two rectangular groove rails 67 are formed in the lower groove wall surface 64A of the ring attachment groove 64. The rectangular groove rails 67 extend in a circular ring-like configuration so as to form two concentric circles. Each of the rectangular groove rails 67 is formed as a rectangular recessed groove having a rectangular C-shaped cross-section with an opening facing upward.

The two peak-shaped fitting projections 68 as fitting portions are formed in the lower surface of the attachment portion 65A of the lip ring 65. The peak-shaped fitting projections 68 are concentrically disposed in a manner such that each of the peak-shaped fitting projections 68 is located in a radially outer position in the corresponding groove rail 67. Each of the peak-shaped fitting projections 68 is formed as a projection having a peak-shaped cross-section projecting downward.

The ratchet mechanism 69 serves as a direction-of-rotation limiting portion for permitting rotation of the lip ring 65 in only one of the circumferential directions. The ratchet mechanism 69 is disposed between one of the two rectangular groove rails 67, for example, the one which is located on the radially inner side, and the peak-shaped fitting projection 68 disposed in this one rectangular groove rail 67.

The ratchet mechanism 69 comprises a first gear portion 69A formed by serrating a bottom surface of the rectangular groove rail 67 in a circumferential direction, and a second gear portion 69B formed by serrating a projecting end of the peak-shaped fitting projection 68 in the circumferential direction so as to engage with the first gear portion 69A. Thus, the ratchet mechanism 69 allows rotation of the lip ring 65 in a direction indicated by an arrow A1 in FIG. 10, that is, a direction in which the inclined surface of the second gear portion 69B faces the inclined surface of the first gear portion 69A, and prevents rotation of the lip ring 65 in a direction indicated by an arrow A2, that is, a direction in which the vertical surface of the second gear portion 69B faces the vertical surface of the first gear portion 69A.

Thus, in the fifth embodiment, substantially the same effects as obtained in the first embodiment can be exerted. Especially, in the fifth embodiment, the ratchet mechanism 69 is provided in the lip ring 65. Therefore, the lip ring 65 can be rotated in only one of the circumferential directions. Therefore, it is possible to prevent reciprocal movement of the lip ring 65 relative to a circumferential direction of the piston 61, and wear on the lip portion 65B can be reliably distributed around the entire periphery of the lip ring 65.

In the fifth embodiment, the ratchet mechanism 69 is provided only in one of the two rectangular groove rails 67, that is, the rectangular groove rail 67 located on the radially inner side. However, this does not limit the present invention. The ratchet mechanism 69 may be provided in only the rectangular groove rail 67 located on the radially outer side, or in each of the two rectangular groove rails 67. The ratchet mechanism may be provided separately from the seal portion 66 (the rectangular groove rails 67 and the peak-shaped fitting projections 68).

Figure 11:
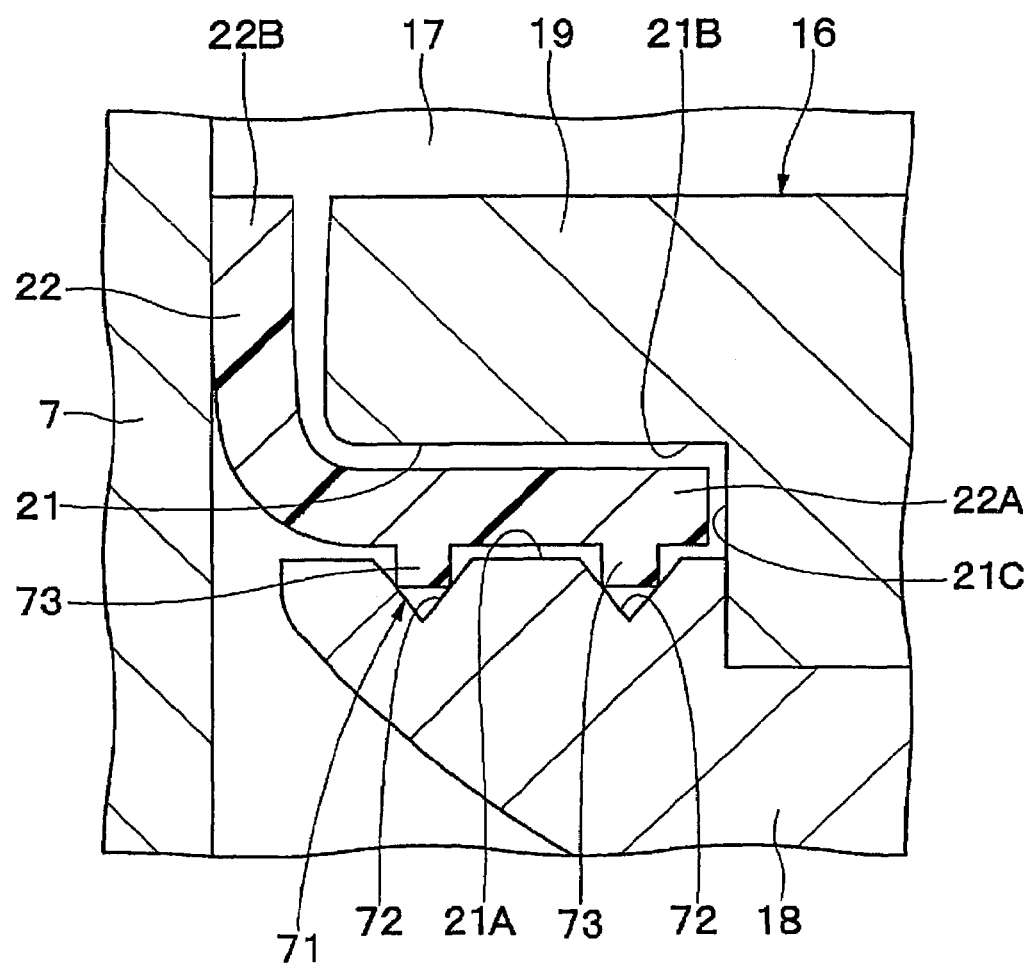
FIG. 11 is an enlarged cross-sectional view of an essential part of the present invention, showing a seal portion in a first modified example with the piston and the lip ring.

In each of the first and fifth embodiments, the seal portion 23 or 66 comprises the rectangular groove rails 24 or 67 having rectangular C-shaped cross-sections formed in the piston 16 or 61, and the peak-shaped fitting projections 25 or 68 having peak-shaped cross-sections formed in the lip ring 22 or 65. However, this does not limit the present invention. For example, as shown in FIG. 11 indicating a first modified example, a seal portion 71 may be provided by V-shaped groove rails 72 having V-shaped cross-sections formed in the piston 16 and rectangular fitting projections 73 having rectangular cross-sections formed in the lip ring 22.

Figure 12:
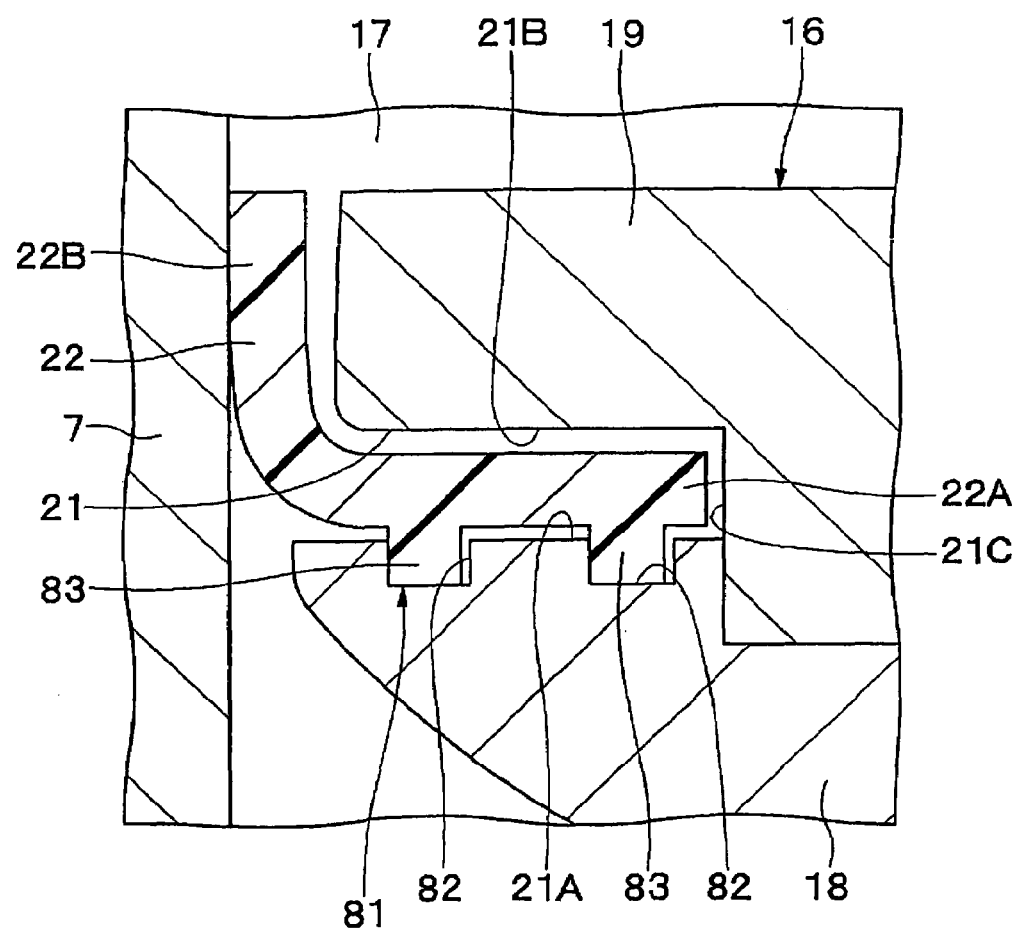
FIG. 12 is an enlarged cross-sectional view of an essential part of the present invention, showing a seal portion in a second modified example with the piston and the lip ring.

Alternatively, as shown in FIG. 12 indicating a second modified example, a seal portion 81 may be provided by rectangular groove rails 82 having rectangular C-shaped cross-sections formed in the piston 16 and rectangular fitting projections 83 having rectangular cross-sections formed in the lip ring 22. The rails and fitting portions forming the seal portion may have various shapes, such as a U-shaped cross-section, a trapezoidal cross-section, etc.

Figure 13:
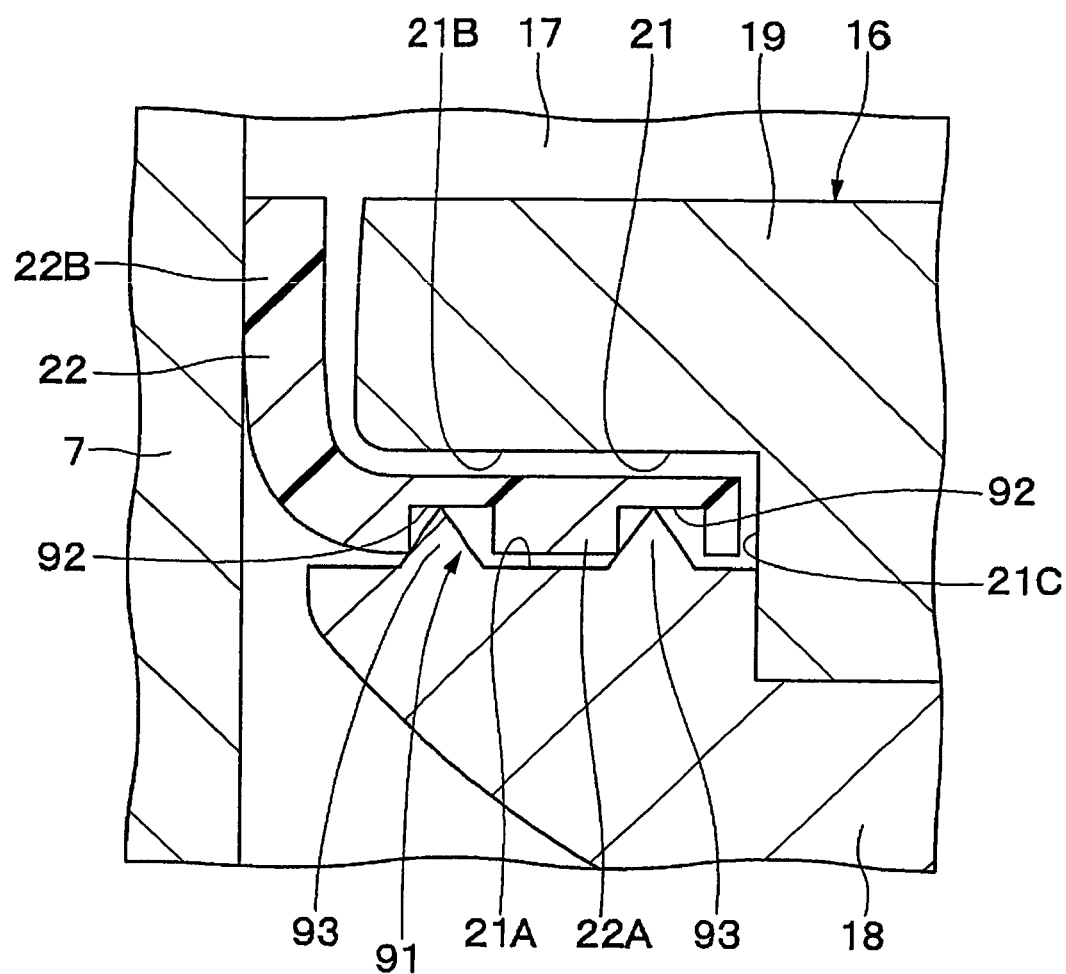
FIG. 13 is an enlarged cross-sectional view of an essential part of the present invention, showing a seal portion in a third modified example with the piston and the lip ring.

In each of the first and fifth embodiments, the rectangular groove rails 24 or 67 are formed in the piston 16 or 61, and the peak-shaped fitting projections 25 or 68 are formed in the lip ring 22 or 65. However, this does not limit the present invention. For example, as shown in FIG. 13 indicating a third modified example, a seal portion 91 may be provided by rectangular groove rails 92 formed in the lip ring 22 and peak-shaped fitting projections 93 formed in the piston 16. This arrangement can also be applied to other embodiments and modified examples.

In each of the first, second, fourth and fifth embodiments, the lip ring 22, 35, 55 or 65 is formed using a resin material, and in the third embodiment, the lip ring 41 is formed from a resin material and a metal material. However, this does not limit the present invention. For example, a lip ring may be formed using a composite material comprising a mixture of a resin material and a metal material (such as metal powder).

In the first embodiment, two combinations of the rectangular groove rail 24 and the peak-shaped fitting projection 25 are provided so as to form two concentric circles. However, this does not limit the present invention. One, or three or more combinations of the rectangular groove rail 24 and the peak-shaped fitting projection 25 may be provided. This arrangement can also be applied to other embodiments and modified examples.

Figure 14:
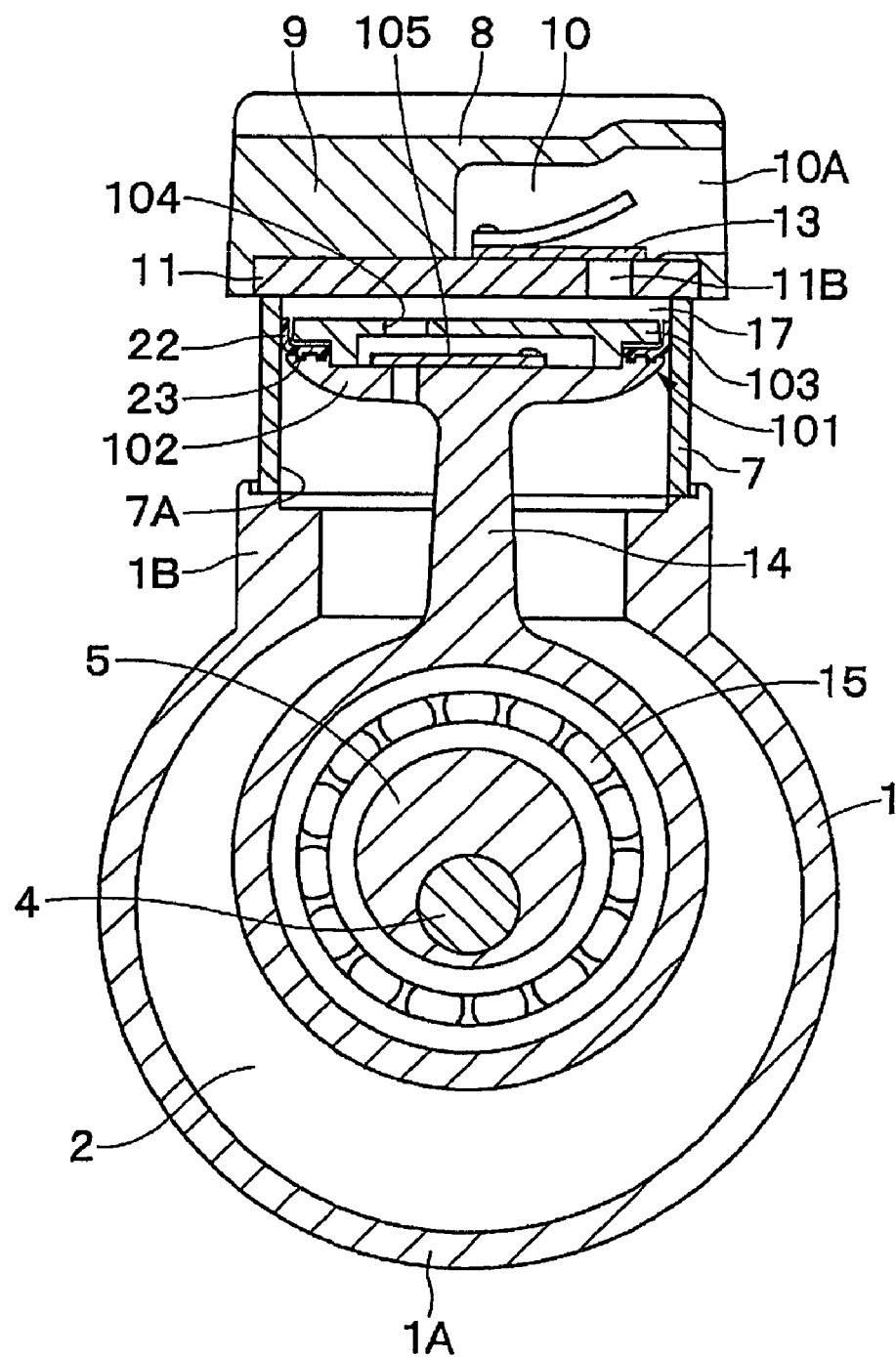
FIG. 14 is a cross-sectional view, corresponding to FIG. 2, of an oscillating type compressor according to a fourth modified example of the present invention.

In the first to fifth embodiments, the suction port 11A formed in the valve seat plate 11 is opened and closed using the suction valve 12. However, this does not limit the present invention. For example, as shown in FIG. 14 indicating a fourth modified example, a suction port 104 for communication between the crank chamber 2 and the compression chamber 17 may be formed in a piston body 102 and a retainer 103 forming a piston 101, with a suction valve 105 for opening and closing the suction port 104 being provided in the piston 101.

Figure 15:
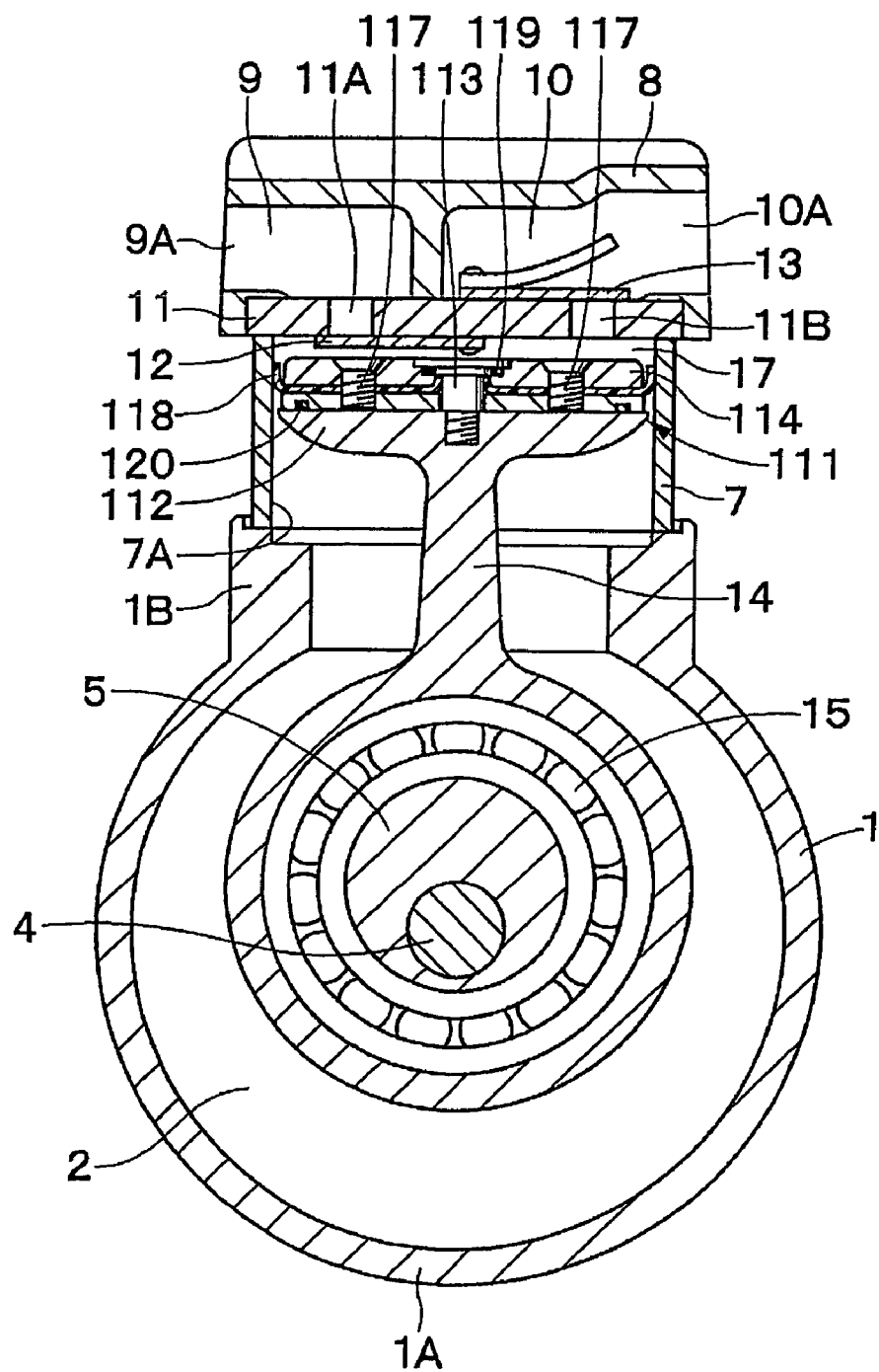
FIG. 15 is a cross-sectional view, corresponding to FIG. 2, of an oscillating type compressor according to a sixth embodiment of the present invention.
Figure 16:
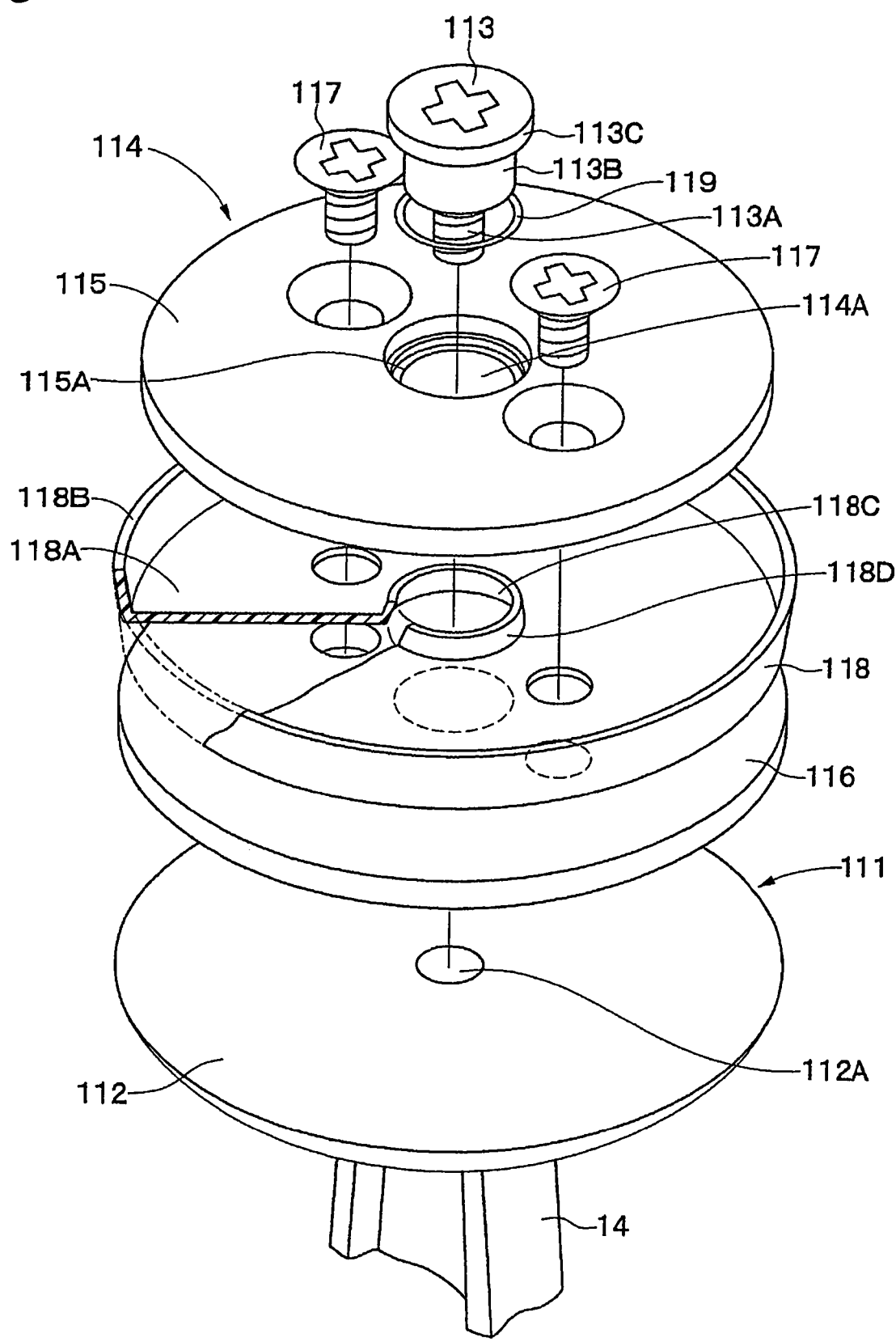
FIG. 16 is a partially cut-away perspective view showing a piston and a lip ring in FIG. 15 in a disassembled state.
Figure 17:
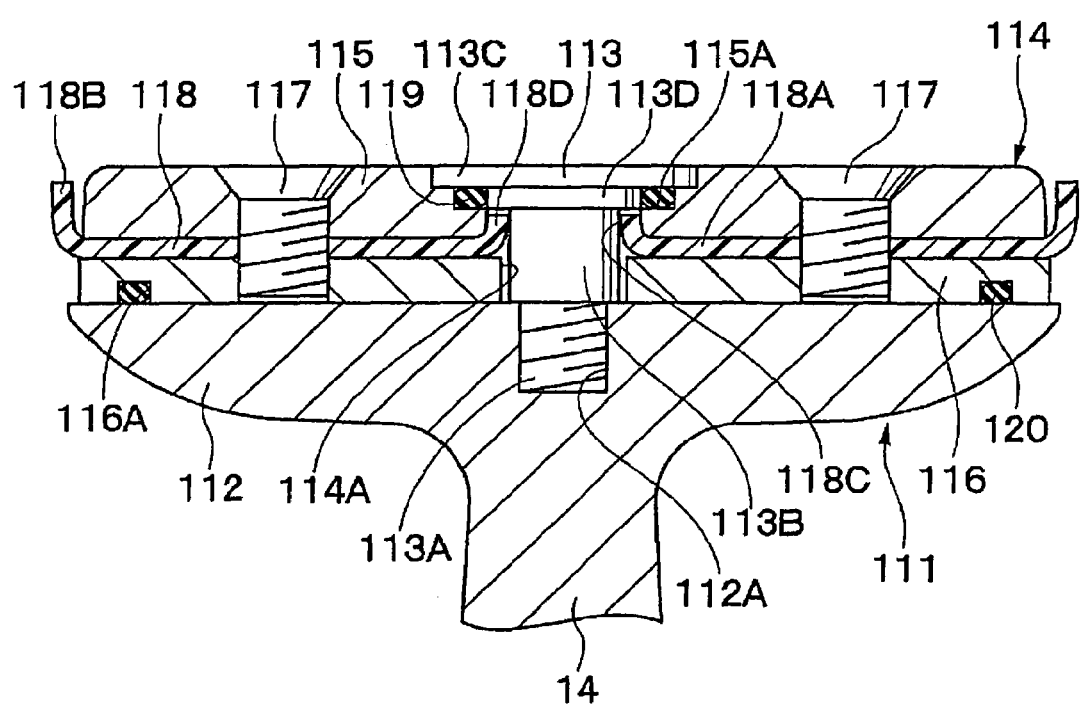
FIG. 17 is an enlarged cross-sectional view of an essential part of the present invention, showing the piston and the lip ring in FIG. 15.

Next, FIGS. 15 to 17 show a sixth embodiment of the present invention. This embodiment is characterized in that the piston has a rotatable member rotatable in a circumferential direction, and that the lip ring is fixed to an outer circumferential portion of the rotatable member. In the sixth embodiment, the same elements as used in the first embodiment are indicated by the same reference numerals, and explanation thereof is omitted.

Referring to FIGS. 15 to 17, reference numeral 111 denotes an oscillating type piston in the sixth embodiment. The piston 111 is slidably provided in the cylinder 7, and reciprocally moves in the cylinder 7 while being oscillated. The piston 111, together with the valve seat plate 11, defines the compression chamber 17 in the cylinder 7. The piston 111 comprises a piston body 112, a shaft member 113 and a ring attachment member 114 (described later).

The piston body 112 is in a disc-like form forming a lower portion of the piston 111. The distal end portion of the piston rod 14 is integrally connected to a central portion of a lower surface of the piston body 112. Thus, the piston body 112 is capable of reciprocating in the cylinder 7 while being oscillated. A threaded opening 112A for threadable engagement with the shaft member 113 is formed at a central portion of an upper surface of the piston body 112.

The shaft member 113, which is attached to the central portion of the piston body 112, has a stepped cylindrical configuration. The shaft member 113 comprises a threaded portion 113A formed on a base end thereof and threadably engaged with the threaded opening 112A, a small-diameter cylindrical support 113B extending in an axial direction from the threaded portion 113A, and a large-diameter cylindrical flange portion 113C provided at a distal end of the support 113B. The ring attachment member 114 is rotatably supported by the support 113B, while the flange portion 113C prevents separation of the ring attachment member 114 from the piston body 112. A shoulder portion 113D is formed between the support 113B and the flange portion 113C. An O-ring 119 (described later) is attached to an outer circumferential surface of the shoulder portion 113D.

The ring attachment member 114 is provided on an upper side of the piston body 112. The ring attachment member 114 includes an insertion opening 114A, which axially extends through a central portion of the ring attachment member 114 corresponding to the center of rotation. The shaft member 113 is inserted through the insertion opening 114A of the ring attachment member 114. Thus, the ring attachment member 114 is supported by the shaft member 113 so as to be rotatable in a circumferential direction of the piston 111.

The ring attachment member 114 comprises two retainer rings 115 and 116 in circular ring-like forms. The retainer rings 115 and 116, each of which is formed by a substantially circular plate, are connected to each other in an overlapping relationship by means of bolts 117. A lip ring 118 (described later) is held by the retainer rings 115 and 116.

In the retainer ring 115 located on a side of the compression chamber 17, an O-ring attachment groove 115A for attachment to the O-ring 119 (described later) is formed in the insertion opening 114A on a side of an open end thereof. Further, as shown in FIG. 17, the retainer ring 116 located on a side of the piston body 112 includes an O-ring attachment groove 116A for attachment to an O-ring 120 (described later) formed in a rear surface thereof facing the piston body 112. The O-ring attachment groove 116A extends annularly in a circumferential direction of the ring attachment member 114.

The lip ring 118 is fixed to the ring attachment member 114. The lip ring 118 seals a space between the piston 111 and the cylinder 7, to thereby prevent leakage of air (pressure) from the compression chamber 17. The lip ring 118 is made of a resin material having anti-wear properties or self-lubricating properties, and is formed as a seal ring having a rectangular C-shaped cross-section.

Specifically, the lip ring 118 comprises an attachment portion 118A formed as a flat circular ring-like plate, which is located in a radially inner position, and a lip portion 118B bent from a radially outer portion of the attachment portion 118A. The lip portion 118B extends upwardly towards the compression chamber 17 while being diametrically enlarged, namely diverging, to thereby make slidable contact with the inner circumferential surface 7A of the cylinder 7. The lip ring 118 further comprises an insertion opening 118C, which extends through a central portion of the attachment portion 118A, and through which the shaft member 113 is inserted. The lip ring 118 further comprises a shaft-side lip portion 118D extending along the periphery of the insertion opening 118C. The shaft-side lip portion 118D is bent along the shaft member 113 towards the compression chamber 17.

The lip ring 118 is fixed to the ring attachment member 114 by the attachment portion 118A being held by the retainer rings 115 and 116. The shaft-side lip portion 118D of the lip ring 118 is inserted between the shaft member 113 and the insertion opening 114A of the ring attachment member 114 (the retainer ring 115), and makes contact with the entire periphery of the shaft member 113. Thus, the shaft-side lip portion 118D, together with the O-ring 119, forms a seal portion, thus preventing air in the compression chamber 17 from leaking through a space between the shaft member 113 and the ring attachment member 114.

The O-ring 119, together with the shaft-side lip portion 118D of the lip ring 118, forms a first seal portion. The O-ring 119 is formed in a circular ring-like configuration using an elastic resin material. The O-ring 119 is attached between the outer periphery of the shoulder portion 113D of the shaft member 113 and the O-ring attachment groove 115A of the retainer ring 115. Thus, the O-ring 119 makes resilient contact with the retainer ring 115 and the shaft member 113, thus sealing a space between the ring attachment member 114 and the shaft member 113.

The O-ring 120 forms a second seal portion. The O-ring 120 is formed in a circular ring-like configuration using an elastic resin material, and attached to the O-ring attachment groove 116A of the retainer ring 116. Thus, the O-ring 120 makes resilient contact with the retainer ring 116 and the piston body 112, thus sealing a space between the ring attachment member 114 and the piston body 112.

Thus, in the sixth embodiment, substantially the same effects as obtained in the first embodiment can be exerted. Especially, in the sixth embodiment, the ring attachment member 114 rotatable in a circumferential direction is attached to the piston body 112, while the lip ring 118 is fixed to the ring attachment member 114. Therefore, for example, due to the effect of frictional drag caused by contact between the lip portion 118B and the inner circumferential surface 7A of the cylinder 7, the lip ring 118 can be rotated with the ring attachment member 114 in a circumferential direction of the piston 111. Therefore, portions of the lip ring 118 to be strongly pressed against the inner circumferential surface 7A of the cylinder 7 can be changed. Consequently, wear on the lip ring 118 can be distributed around the entire periphery of the lip ring 118, thus preventing concentrated wear on only a part of the periphery of the lip ring 118, and thus prolonging the life of the lip ring 118. Further, the ring attachment member 114 is rotatably supported on the piston body 112 by means of the shaft member 113. Therefore, the ring attachment member 114 can be rotated about the shaft member 113 in a circumferential direction of the piston 111.

Further, the shaft-side lip portion 118D and the O-ring 119 are provided between the ring attachment member 114 and the shaft member 113. Therefore, a gas-tight seal can be provided between the ring attachment member 114 and the shaft member 113. Further, the O-ring 120 is provided between the ring attachment member 114 and the piston body 112, so that a gas-tight seal can also be provided between the ring attachment member 114 and the piston body 112. Therefore, it is possible to prevent air in the compression chamber 17 from leaking through the space between the ring attachment member 114 and the shaft member 113 or the space between the ring attachment member 114 and the piston body 112.

Figure 18:
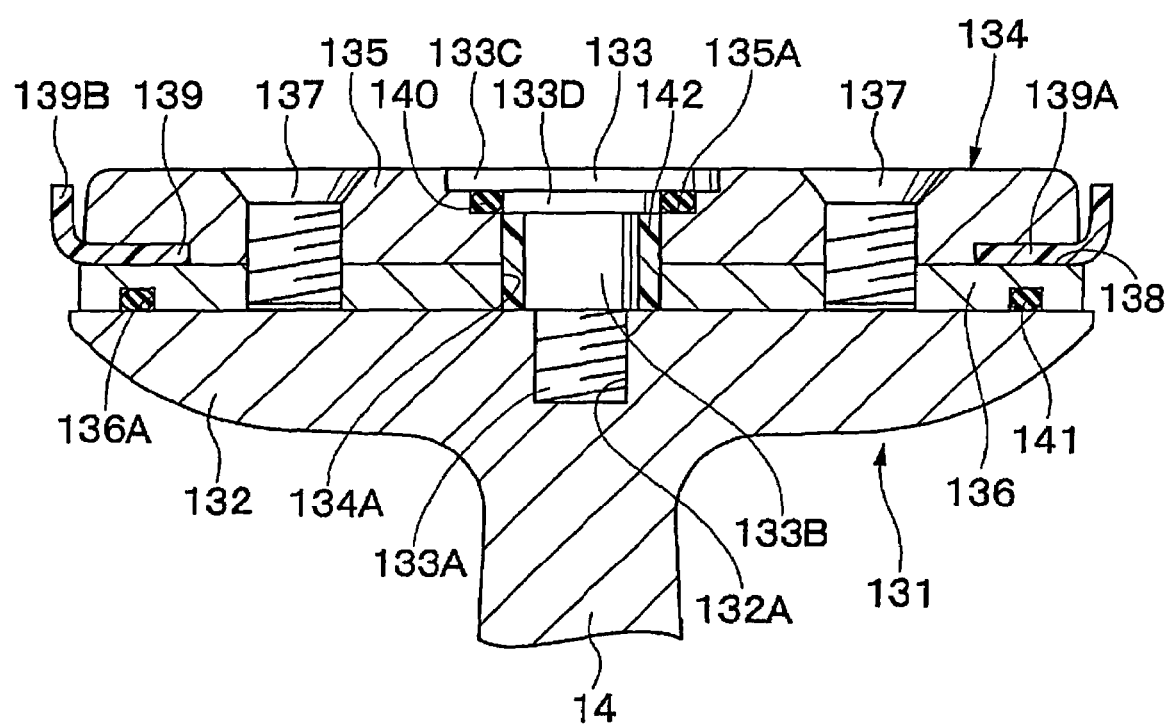
FIG. 18 is an enlarged cross-sectional view of an essential part of the present invention, showing a piston and a lip ring in a seventh embodiment of the present invention.

Next, FIG. 18 shows a seventh embodiment of the present invention. This embodiment is characterized in that a sleeve bearing is provided between the ring attachment member and the shaft member. In the seventh embodiment, the same elements as used in the first embodiment are indicated by the same reference numerals, and explanation thereof is omitted.

In FIG. 18, reference numeral 131 denotes a piston in the seventh embodiment. Substantially as in the case of the piston 111 in the sixth embodiment, the piston 131 comprises a piston body 132, a shaft member 133, a ring attachment member 134, etc. The piston body 132 is formed in a circular disc-like configuration, and a threaded opening 132A for threadable engagement with the shaft member 133 is formed in a central portion of the piston body 132.

The shaft member 133 is formed in a stepped cylindrical configuration, and attached to the central portion of the piston body 132. The shaft member 133 comprises a threaded portion 133A located on a base end thereof for threadable engagement with the threaded opening 132A. The shaft member 133 further comprises a small-diameter cylindrical support 133B extending in an axial direction from the threaded portion 133A, and a large-diameter cylindrical flange portion 133C provided at a distal end of the support 133B. The ring attachment member 134 is rotatably supported by the support 133B, while the flange portion 133C prevents separation of the ring attachment member 134 from the piston body 132. A shoulder portion 133D is formed between the support 133B and the flange portion 133C. An O-ring 140 (described later) is attached to an outer circumferential surface of the shoulder portion 133D.

The ring attachment member 134 includes an insertion opening 134A, which axially extends through a central portion of the ring attachment member 134. The shaft member 133 is inserted through the insertion opening 134A. Thus, the ring attachment member 134 is supported by means of the shaft member 133 so as to be rotatable in a circumferential direction of the piston 131.

The ring attachment member 134 comprises two retainer rings 135 and 136 in circular ring-like forms. The retainer rings 135 and 136, each of which is formed by a substantially circular plate, are overlappingly connected to each other by means of bolts 137. A ring attachment groove 138 is formed between the retainer ring 136 and an outer circumferential portion of the retainer ring 135. The ring attachment groove 138 comprises a circumferential recessed groove extending along the entire periphery of the ring attachment member 134. The ring attachment groove 138 has a narrow opening facing radially outward. A lip ring 139 (described later) is fixed to the ring attachment groove 138.

In the retainer ring 135 located on a side of the compression chamber 17, an O-ring attachment groove 135A for attachment to the O-ring 140 (described later) is formed in the insertion opening 134A on a side of an open end thereof. Further, the retainer ring 136 located on a side of the piston body 132 includes an O-ring attachment groove 136A for attachment to an O-ring 141 (described later) formed in a rear surface thereof facing the piston body 132. The O-ring attachment groove 136A extends annularly in a circumferential direction of the ring attachment member 134.

The lip ring 139 in the seventh embodiment is adapted to seal a space between the ring attachment member 134 and the cylinder 7. The lip ring 139 comprises an attachment portion 139A formed by a circular ring-shaped plate attached to the ring attachment groove 138, and a lip portion 139B provided in a radially outer portion of the attachment portion 139A and adapted to make slidable contact with the inner circumferential surface 7A of the cylinder 7. The attachment portion 139A is held by the retainer rings 135 and 136 in the ring attachment groove 138, thus fixing the lip ring 139 to an outer circumferential portion of the ring attachment member 134.

The O-ring 140 forms the first seal portion. The O-ring 140 is formed in a circular ring-like configuration using an elastic resin material, and is attached between the outer circumferential surface of the shoulder portion 133D of the shaft member 133 and the O-ring attachment groove 135A of the retainer ring 135. Therefore, the O-ring 140 makes resilient contact with the retainer ring 135 and the shaft member 133, to thereby seal a space between the ring attachment member 134 and the shaft member 133.

The O-ring 141 forms the second seal portion. The O-ring 141 is formed in a circular ring-like configuration using an elastic resin material, and is attached to the O-ring attachment groove 136A of the retainer ring 136. Therefore, the O-ring 141 makes resilient contact with the retainer ring 136 and the piston body 132, to thereby seal a space between the ring attachment member 134 and the piston body 132.

Reference numeral 142 denotes a sleeve bearing provided between the ring attachment member 134 and the shaft member 133. The sleeve bearing 142 is in a cylindrical form and made of a fluororesin material having lubricating properties, by way of example. The sleeve bearing 142 is disposed so as to extend along the entire outer periphery of the support 133B of the shaft member 133, thus preventing direct contact between the ring attachment member 134 and the shaft member 133 and preventing occurrence of wear on these members. Preferably, the sleeve bearing 142 allows rotation of the ring attachment member 134 during start-up of the compressor, and thermally expands and prevents rotation of the ring attachment member 134 during operation of the compressor. In this case, undesirable rotation of the lip ring 139 can be prevented using the sleeve bearing 142.

Thus, in the seventh embodiment, substantially the same effects as obtained in the first and sixth embodiments can be exerted. Especially in the seventh embodiment, the sleeve bearing 142 is provided between the ring attachment member 134 and the shaft member 133. Therefore, it is possible to prevent rattling of the ring attachment member 134 and occurrence of wear due to contact between the ring attachment member 134 and the shaft member 133.

Figure 19:
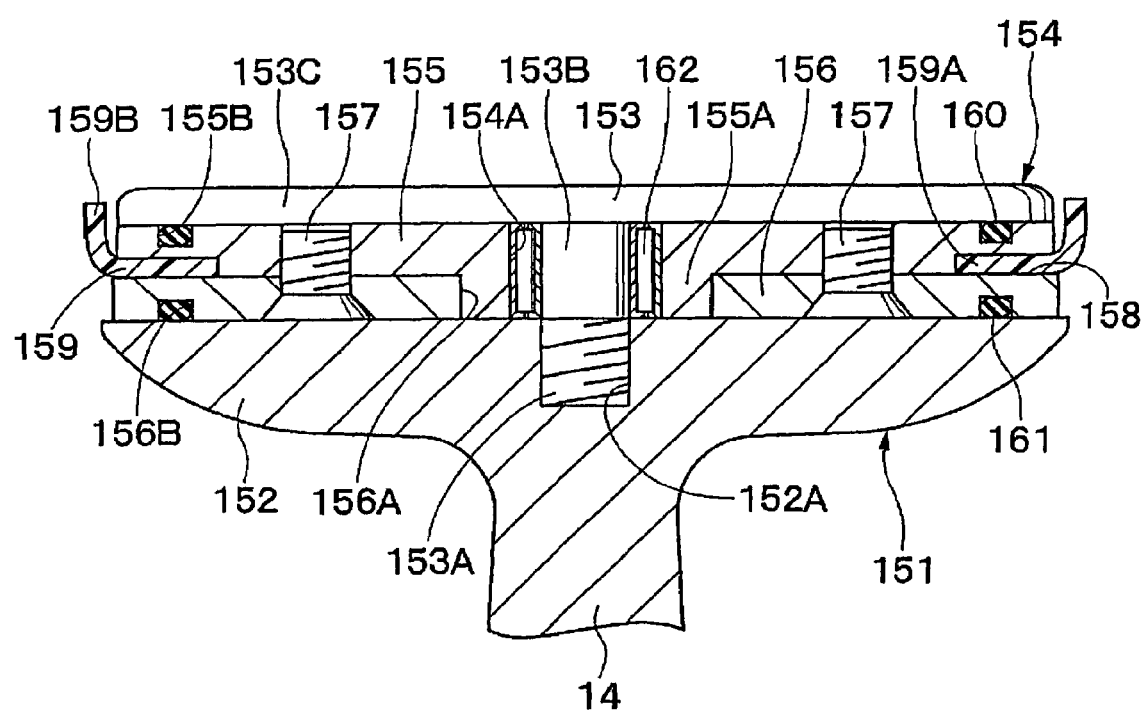
FIG. 19 is an enlarged cross-sectional view of an essential part of the present invention, showing a piston and a lip ring in an eighth embodiment of the present invention.

Next, FIG. 19 shows an eighth embodiment of the present invention. This embodiment is characterized in that a needle bearing is provided between the ring attachment member and the shaft member. In the eighth embodiment, the same elements as used in the first embodiment are indicated by the same reference numerals, and explanation thereof is omitted.

In FIG. 19, reference numeral 151 denotes a piston in the eighth embodiment. Substantially as in the case of the piston 111 in the sixth embodiment, the piston 151 comprises a piston body 152, a shaft member 153, a ring attachment member 154, etc. The piston body 152 is in a circular disc-like form, and a threaded opening 152A for threadable engagement with the shaft member 153 is formed in a central portion of the piston body 152.

The shaft member 153 is attached to the central portion of the piston body 152. The shaft member 153 comprises a threaded portion 153A formed on a base end thereof for threadable engagement with the threaded opening 152A. The shaft member 153 further comprises a small-diameter cylindrical support 153B extending in an axial direction from the threaded portion 153A, and a large-diameter cylindrical flange portion 153C provided on a distal end of the support 153B. The ring attachment member 154 is rotatably supported by the support 153B. The flange portion 153C covers an entire upper surface of the ring attachment member 154, thus preventing separation of the ring attachment member 154 from the piston body 152.

The ring attachment member 154 includes an insertion opening 154A which axially extends through a central portion of the ring attachment member 154. The shaft member 153 is inserted through the insertion opening 154A. Thus, the ring attachment member 154 is supported by means of the shaft member 153 so as to be rotatable in a circumferential direction of the piston 151.

The ring attachment member 154 comprises two retainer rings 155 and 156 in circular ring-like forms. The retainer rings 155 and 156, each of which is formed by a substantially circular plate, are overlappingly connected to each other by means of bolts 157. A projection 155A is formed in an inner circumferential portion of the retainer ring 155 so as to project towards the retainer ring 156. The projection 155A is inserted into a through-hole 156A formed in a central portion of the retainer ring 156. A ring attachment groove 158 is formed between the retainer ring 156 and an outer circumferential portion of the retainer ring 155. The ring attachment groove 158 comprises a circumferential recessed groove extending along the entire periphery of the retainer ring 155. The ring attachment groove 158 has a narrow opening facing radially outward. A lip ring 159 (described later) is fixed to the ring attachment groove 158.

In the retainer ring 155 located on a side of the compression chamber 17, an O-ring attachment groove 155B for attachment to an O-ring 160 (described later) is formed in a front surface thereof facing the flange portion 153C of the shaft member 153. Further, the retainer ring 156 located on a side of the piston body 152 includes an O-ring attachment groove 156B for attachment to an O-ring 161 (described later) formed in a rear surface thereof facing the piston body 152. The O-ring attachment groove 156B extends annularly in a circumferential direction of the ring attachment member 154.

The lip ring 159 in the eighth embodiment is adapted to seal a space between the ring attachment member 154 and the cylinder 7. The lip ring 159 comprises an attachment portion 159A formed by a circular ring-shaped plate attached to the ring attachment groove 158, and a lip portion 159B provided in a radially outer portion of the attachment portion 159A and adapted to make slidable contact with the inner circumferential surface 7A of the cylinder 7. The attachment portion 159A is held by the retainer rings 155 and 156 in the ring attachment groove 158, to thereby fix the lip ring 159 to an outer circumferential portion of the ring attachment member 154.

The O-ring 160 forms the first seal portion. The O-ring 160 is formed in a circular ring-like configuration using an elastic resin material, and attached to the O-ring attachment groove 155B of the retainer ring 155. Therefore, the O-ring 160 makes resilient contact with the retainer ring 155 and the flange portion 153C of the shaft member 153, to thereby seal a space between the ring attachment member 154 and the shaft member 153.

The O-ring 161 forms the second seal portion. The O-ring 161 is formed in a circular ring-like configuration using an elastic resin material, and is attached to the O-ring attachment groove 156B of the retainer ring 156. Therefore, the O-ring 161 makes resilient contact with the retainer ring 156 and the piston body 152, to thereby seal a space between the ring attachment member 154 and the piston body 152.

The needle bearing 162 is provided between the ring attachment member 154 and the shaft member 153. The needle bearing 162 is formed by providing a plurality of cylindrical rollers in a rotatable state between an outer ring and an inner ring. The needle bearing 162 is attached between the support 153B of the shaft member 153 and the insertion opening 154A of the retainer ring 155, and prevents direct contact between the ring attachment member 154 and the shaft member 153, thus preventing wear on these members.

Thus, in the eighth embodiment, substantially the same effects as obtained in the first, sixth and seventh embodiments can be exerted.

In the eighth embodiment, the needle bearing 162 is used as a bearing member. However, a ball bearing may be used as a bearing member, in which ball members are held between an inner ring and an outer ring.

In the above-mentioned embodiments, the oscillating type compressor is applied to compressing air. However, this does not limit the present invention. The oscillating type compressor of the present invention may be applied to, for example, compressing a refrigerant.

What is claimed is:

1. An oscillating type compressor comprising:
   a cylinder;
   a piston adapted to reciprocate within the cylinder while being oscillated, said piston defining a compression chamber in the cylinder; and
   a lip ring provided in an outer circumferential portion of the piston, said lip ring being adapted to seal a space between the piston and the cylinder, wherein the lip ring is provided so as to be rotatable in a circumferential direction of the piston during operation of the oscillating type compressor.

2. An oscillating type compressor according to claim 1, wherein:
a ring attachment groove is formed in an outer circumferential surface of the piston, said ring attachment groove comprising a circumferential recessed groove extending along an entire periphery of the piston and having an opening facing in a radially outward direction of the piston; and
said lip ring comprises an annular attachment portion rotatably attached to the ring attachment groove, and a lip portion bent from a radially outer portion of the attachment portion towards the compression chamber, wherein said annular attachment portion is rotatable during operation of the oscillating type compressor.

3. An oscillating type compressor according to claim 2, wherein a seal portion is provided between said ring attachment groove of the piston and said attachment portion of the lip ring so as to seal a space between said piston and said lip ring.

4. An oscillating type compressor according to claim 3, wherein:
said ring attachment groove is formed by a pair of groove wall surfaces and a groove bottom surface, said pair of groove wall surfaces facing each other and extending along the entire periphery of said piston, said groove bottom surface being positioned at innermost portions of said groove wall surfaces; and
said seal portion comprises an annular rail formed in one groove wall surface of said pair of groove wall surfaces against which said lip ring is adapted to be pressed under a pressure in the compression chamber, and an annular fitting portion formed in the attachment portion of the lip ring, said fitting portion being adapted to be fitted into said annular rail in a gas-tight manner when said lip ring is pressed against said one groove wall surface.

5. An oscillating type compressor according to claim 4, wherein a dimension of a space in said ring attachment groove is set to be larger than a dimension of a thickness of the attachment portion of the lip ring.

6. An oscillating type compressor according to claim 3, wherein:
said ring attachment groove is formed by a pair of groove wall surfaces and a groove bottom surface, said pair of groove wall surfaces facing each other and extending along the entire periphery of said piston, said groove bottom surface being positioned at innermost portions of said groove wall surfaces; and
said seal portion comprises a radially inner-side projection formed in a radially inner portion of the attachment portion of the lip ring, said radially inner-side projection being adapted to abut against said groove bottom surface of the ring attachment groove in a gas-tight manner under a pressure in the compression chamber.

7. An oscillating type compressor according to claim 5, wherein a dimension of a space in said ring attachment groove is set to be larger than a dimension of a thickness of the attachment portion of the lip ring.

8. An oscillating type compressor according to claim 3, wherein:
said ring attachment groove is formed by a pair of groove wall surfaces and a groove bottom surface, said pair of groove wall surfaces facing each other and extending along the entire periphery of said piston, said groove bottom surface being positioned at innermost portions of said groove wall surfaces; and
said seal portion comprises an annular seal attachment groove formed in either one of said pair of groove wall surfaces and a seal member attached to said seal attachment groove, said seal member being adapted to resiliently abut against the attachment portion of the lip ring.

9. An oscillating type compressor according to claim 6, wherein a dimension of a space in said ring attachment groove is set to be larger than a dimension of a thickness of the attachment portion of the lip ring.

10. An oscillating type compressor according to claim 3, wherein a dimension of a space in said ring attachment groove is set to be larger than a dimension of a thickness of the attachment portion of the lip ring.

11. An oscillating type compressor according to claim 2, wherein a dimension of a space in said ring attachment groove is set to be larger than a dimension of a thickness of the attachment portion of the lip ring.

12. An oscillating type compressor according to claim 1, wherein:
said piston comprises a piston body adapted to reciprocate within the cylinder while being oscillated, and a rotatable member provided so as to be rotatable relative to the piston body in a circumferential direction of the piston during operation of the oscillating type compressor; and
said lip ring is fixed to an outer circumferential portion of the rotatable member so as to seal a space between the rotatable member and the cylinder.

13. An oscillating type compressor according to claim 12, wherein:
a shaft member is provided in the piston body so as to support said rotatable member in a rotatable state; and
said rotatable member comprises a ring attachment member including an insertion opening formed in a portion thereof corresponding to the center of rotation, said shaft member being inserted through said insertion opening, said lip ring being fixed to said ring attachment member.

14. An oscillating type compressor according to claim 13, wherein:
a first seal portion is provided between said ring attachment member and said shaft member so as to seal a space therebetween; and
a second seal portion is provided between said ring attachment member and said piston body so as to seal a space therebetween.

15. An oscillating type compressor according to claim 13, wherein a bearing is provided between the ring attachment member and the shaft member.

16. An oscillating type compressor according to claim 14, wherein a bearing is provided between the ring attachment member and the shaft member.

* * * * *